US012628083B2

(12) United States Patent
Liu et al.

(10) Patent No.: US 12,628,083 B2
(45) Date of Patent: May 12, 2026

(54) COMMUNICATION METHOD AND APPARATUS

(71) Applicant: HUAWEI TECHNOLOGIES CO., LTD., Shenzhen (CN)

(72) Inventors: Fengxi Liu, Shenzhen (CN); Hua Ming, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 659 days.

(21) Appl. No.: 17/946,381

(22) Filed: Sep. 16, 2022

(65) Prior Publication Data

US 2023/0017306 A1    Jan. 19, 2023

Related U.S. Application Data

(63) Continuation of application No. PCT/CN2020/079791, filed on Mar. 17, 2020.

(51) Int. Cl.
| | |
|---|---|
| *H04W 52/02* | (2009.01) |
| *H04L 67/12* | (2022.01) |
| *H04W 72/04* | (2023.01) |
| *H04W 76/14* | (2018.01) |

(52) U.S. Cl.
CPC ......... *H04W 52/0251* (2013.01); *H04L 67/12* (2013.01); *H04W 52/028* (2013.01); *H04W 76/14* (2018.02)

(58) Field of Classification Search
None
See application file for complete search history.

(56) References Cited

U.S. PATENT DOCUMENTS

| | | | | |
|---|---|---|---|---|
| 9,143,216 | B1* | 9/2015 | Loc | H04L 1/0026 |
| 9,678,338 | B1* | 6/2017 | Bamberger | G02B 27/01 |
| 9,853,969 | B2* | 12/2017 | Enke | H04W 4/80 |
| 2013/0065627 | A1 | 3/2013 | Jung et al. | |
| 2014/0313960 | A1* | 10/2014 | Skinner | H04W 52/0209 |
| | | | | 370/311 |
| 2017/0367126 | A1* | 12/2017 | Ikeda | H04N 23/66 |
| 2018/0063487 | A1* | 3/2018 | Gage | G08G 1/096725 |
| 2018/0279050 | A1* | 9/2018 | Ryu | H04L 67/12 |

(Continued)

FOREIGN PATENT DOCUMENTS

| | | |
|---|---|---|
| CN | 105847275 A | 8/2016 |
| CN | 105871868 A | 8/2016 |

(Continued)

*Primary Examiner* — Duc T Duong
(74) *Attorney, Agent, or Firm* — Rimon PC

(57) ABSTRACT

A communication method and apparatus are provided, to resolve a problem that timeliness of data transmission is affected because a communication connection is not established in time. A network protocol stack is deployed for each of a service processing unit and a wireless communication unit in a first communication apparatus. In this way, before the service processing unit enters a working mode, the wireless communication unit may establish a transmission channel with a second communication apparatus based on the deployed network protocol stack. After the service processing unit enters the working mode, the service processing unit exchanges data with the second communication apparatus through the transmission channel based on the deployed network protocol stack.

20 Claims, 21 Drawing Sheets

S1101

Before a service processing unit enters a working mode, a wireless communication unit establishes a transmission channel with a second communication apparatus

S1102

After the service processing unit enters the working mode, a service transmission unit communicates with the second communication apparatus through the transmission channel

(56) References Cited

U.S. PATENT DOCUMENTS

| | | | |
|---|---|---|---|
| 2019/0014459 A1* | 1/2019 | Zong ........................ | H04W 4/80 |
| 2019/0069234 A1* | 2/2019 | Neelakandan ........ | H04W 48/16 |
| 2022/0143483 A1* | 5/2022 | Liu ........................ | G06F 1/3203 |
| 2022/0347398 A1* | 11/2022 | Paramanandam .. | A61M 5/5086 |
| 2023/0001531 A1* | 1/2023 | Rzasa ........................ | B25F 5/00 |

FOREIGN PATENT DOCUMENTS

| | | | |
|---|---|---|---|
| CN | 106027599 | A | 10/2016 |
| CN | 109495599 | A | 3/2019 |
| CN | 109618418 | A | 4/2019 |
| CN | 110730203 | A | 1/2020 |
| EP | 3258651 | A1 | 12/2017 |
| JP | 2017076292 | A | 4/2017 |

* cited by examiner

COMMUNICATION METHOD AND APPARATUS

CROSS-REFERENCE TO RELATED APPLICATIONS

This application is a continuation of International Application No. PCT/CN2020/079791, filed on Mar. 17, 2020, the disclosure of which is hereby incorporated by reference in its entirety.

TECHNICAL FIELD

This application relates to the field of communication technologies, and in particular, to a communication method and apparatus.

BACKGROUND

Currently, a photography device powered by a battery generally includes a camera chip and a Wi-Fi chip. The camera chip is configured to capture, encode, and store audio/video. The Wi-Fi chip is configured to receive and send wireless network data. To reduce battery consumption, when the photography device is in a standby state, the camera chip is usually in a power-off state, and the Wi-Fi chip is usually in a working state. When the photography device changes from the standby state to the working state, the camera chip is in a power-on state, namely, the working state.

To improve transmission efficiency between the photography device and a terminal device, a peer to peer (P2P) channel may be established between the photography device and the terminal device. However, when the P2P channel is created, a P2P hole punching process can be started only after a service processing unit is powered on, and the P2P hole punching process is complex. The service processing unit can perform data transmission with the terminal device only after hole punching succeeds. Consequently, timeliness of data transmission is affected.

SUMMARY

Embodiments of this application provide a communication method and apparatus, to resolve a problem that timeliness of data transmission is affected because a communication channel is not established in time.

According to a first aspect, an embodiment of this application provides a communication method, applied to a first communication apparatus powered by a battery, where the first communication apparatus includes a service processing unit and a wireless communication unit. The method includes: Before the service processing unit enters a working mode, the wireless communication unit establishes a transmission channel with a second communication apparatus. After the service processing unit enters the working mode, the service processing unit exchanges data with the second communication apparatus through the transmission channel, for example, sends a to-be-sent first network data packet to the second communication apparatus.

According to the foregoing solution, before the service processing unit enters the working mode, the wireless communication unit enables the transmission channel. In this way, after entering the working mode, the service processing unit may directly use (or inherit) the established transmission channel to exchange the data with the second communication apparatus. This avoids wasting time resources compared with triggering a hole punching process after the service processing unit enters the working mode, and ensures timeliness of data transmission.

For example, the first communication apparatus may be a terminal device, and the second communication apparatus may be a terminal device or a server.

For example, when the second communication apparatus is the terminal device, the transmission channel between the first communication apparatus and the second communication apparatus may be a directly connected transmission channel.

In a possible design, when the second communication apparatus is the server, the first communication apparatus and the second communication apparatus create a transmission channel (which may also be referred to as a communication connection), for example, may be a message queuing telemetry transport (MQTT) protocol connection, a constrained application protocol (CoAP) connection, or a transmission control protocol (TCP) connection.

In a possible design, the second communication apparatus is the terminal device, and the transmission channel between the first communication apparatus and the second communication apparatus may be a directly connected transmission channel. The transmission channel is a peer-to-peer P2P channel. That the wireless communication unit establishes a transmission channel with a second communication apparatus may be specifically implemented in the following manner: the wireless communication unit establishes the P2P channel with the second communication apparatus through P2P hole punching.

In a possible design, before the service processing unit sends the to-be-sent first network data packet to the second communication apparatus through the transmission channel after entering the working mode, the method further includes: The service processing unit sends an occupation notification to the wireless communication unit, where the occupation notification indicates to the service processing unit to occupy the transmission channel. After receiving the occupation notification, the wireless communication unit suspends use of the transmission channel to send a network data packet generated by the wireless communication unit to the second communication apparatus.

In the foregoing design, when the service processing unit occupies the transmission channel, the wireless communication unit does not occupy the channel. This reduces the impact of data transmission by the wireless communication unit on service data transmitted by the service processing unit, to reduce a transmission delay of the service data.

In a possible design, that the wireless communication unit suspends use of the transmission channel to send a network data packet generated by the wireless communication unit to the second communication apparatus includes: The wireless communication unit allocates a port used for communicating with the second communication apparatus through the transmission channel to the service processing unit.

According to the foregoing design, the wireless communication unit releases the port to the service processing unit for use. This is simple and easy to implement.

In a possible design, after the service processing unit enters the working mode, the method further includes: The wireless communication unit modifies a second mapping relationship in a stored mapping relationship to the first mapping relationship. Alternatively, the wireless communication unit adds a first mapping relationship to a stored mapping relationship. The first mapping relationship is an association relationship between first parameter information and an identifier of the service processing unit, the first mapping relationship is used for determining that a communication data packet carrying the first parameter information is processed by the service processing unit, the second mapping relationship is an association relationship between second parameter information and an identifier of the wireless communication unit, and the second mapping relationship is used for determining that a network data packet carrying the second parameter information is processed by the wireless communication unit.

According to the foregoing design, when the service processing unit enters the working mode, the transmission channel needs to be used, and a forwarding rule of the wireless communication unit needs to be modified in time, to ensure correct distribution of the network data packet from the second communication apparatus.

In a possible design, after the service processing unit sends the occupation notification to the wireless communication unit, the method further includes: When determining that the service processing unit does not need to communicate with the second communication apparatus, the service processing unit sends an occupation release notification to the wireless communication unit, where the occupation release notification is used for notifying the wireless communication unit that the service processing unit has stopped using the transmission channel. After the wireless communication unit receives the occupation release notification, the wireless communication unit continues to use the transmission channel to send the network data packet generated by the wireless communication unit to the second communication apparatus.

In the foregoing design, when the service processing unit does not need to use the channel, the service processing unit notifies the wireless communication unit in time. This improves channel utilization and reduces resource waste.

In a possible design, after the service processing unit enters the working mode, that the service processing unit sends a to-be-sent first network data packet to the second communication apparatus through the transmission channel includes: The service processing unit encapsulates to-be-sent service data into first-format data, where the first-format data includes data type information, and the data type information indicates a data type of the service data. The service processing unit encapsulates the first-format data into the first network data packet based on channel information of the transmission channel by using a first network protocol stack, and sends the first network data packet to the wireless communication unit. The wireless communication unit sends the first network data packet to the second communication apparatus.

In the foregoing design, the network protocol stack is deployed in the service processing unit, and the service processing unit exchanges the network data packet with the second communication apparatus independently, for example, performs transmission of an audio/video stream. The service processing unit can independently develop a network application. This also facilitates service deployment of the service processing unit.

In a possible design, the channel information of the transmission channel includes one or more of an IP address of the service processing unit, a port number used by the first communication apparatus to communicate with the second communication apparatus, a protocol type, an IP address of the second communication apparatus, or a port number of the second communication apparatus.

In a possible design, the IP address of the service processing unit is the same as the IP address of the wireless communication unit. Therefore, address translation does not need to be performed, to avoid an increase in a data transmission delay caused by address translation. This improves data transmission efficiency.

In a possible design, that the wireless communication unit sends the first network data packet to the second communication apparatus includes: After translating a source address of the first network data packet from address information of the service processing unit into address information of the wireless communication unit, the wireless communication unit sends the first network data packet whose address is translated to the second communication apparatus.

In a possible design, after the service processing unit enters the working mode, the method further includes: The wireless communication unit receives a second network data packet sent by the second communication apparatus through the transmission channel, where the second network data packet carries the first parameter information. The wireless communication unit determines, based on the first parameter information and the first mapping relationship, that the second network data packet is processed by the service processing unit, and sends the second network data packet to the service processing unit. The service processing unit decapsulates the second network data packet by using the first network protocol stack.

In a possible design, that the wireless communication unit sends the second network data packet to the service processing unit includes: The wireless communication unit translates a destination address of the second network data packet from address information of the wireless communication unit into address information of the service processing unit, and sends, based on a translated destination address, the second network data packet whose address is translated to the service processing unit.

In a possible design, before the service processing unit enters the working mode, the method further includes: The wireless communication unit receives a third network data packet from the second communication apparatus through the transmission channel, where the third network data packet carries the second parameter information. When determining, based on the second parameter information and the second mapping relationship, that the third network data packet is processed by the wireless communication unit, the wireless communication unit decapsulates the third network data packet by using a second network protocol stack.

In a possible design, the first parameter information includes one or more of a port number used by the service processing unit to communicate with the second communication apparatus, the IP address of the second communication apparatus, or the port number of the second communication apparatus.

The second parameter information includes one or more of a port number used by the wireless communication unit to communicate with the second communication apparatus, the IP address of the second communication apparatus, or the port number of the second communication apparatus.

In a possible design, the method further includes: The wireless communication unit encapsulates to-be-sent first communication information into a fourth network data packet based on the channel information of the transmission channel by using the second network protocol stack, and sends the fourth network data packet to the second communication apparatus, where the first communication information is used for communicating with the second communication apparatus.

In a possible design, a protocol used for communication between the first communication apparatus and the second communication apparatus is a transmission control protocol TCP. The method further includes: After the service processing unit enters the working mode, the service processing unit prohibits sending a TCP handshake request message to the second communication apparatus through the transmission channel. Alternatively, after the service processing unit enters the working mode, the wireless communication unit returns a TCP handshake acknowledgment message to the service processing unit when receiving a TCP handshake request message sent by the service processing unit to the second communication apparatus.

In the foregoing design, the TCP handshake message is intercepted in time, so that a delay of service data transmission caused by a TCP handshake can be avoided, and timeliness of data transmission can be improved.

According to a second aspect, an embodiment of this application provides a communication apparatus. The communication apparatus is powered by a battery. The communication apparatus includes a service processing unit and a wireless communication unit. The wireless communication unit is configured to establish a transmission channel with a second communication apparatus before the service processing unit enters a working mode. The service processing unit is configured to send a to-be-sent first network data packet to the second communication apparatus through the transmission channel after the service processing unit enters the working mode. The second communication apparatus is a terminal device or a server.

In a possible design, the second communication apparatus is the terminal device, and the transmission channel is a peer-to-peer P2P channel. The wireless communication unit is specifically configured to establish the P2P channel with the second communication apparatus through P2P hole punching.

In a possible design, the service processing unit is further configured to: before sending the to-be-sent first network data packet to the second communication apparatus through the transmission channel after the service processing unit enters the working mode, send an occupation notification to the wireless communication unit, where the occupation notification indicates to the service processing unit to occupy the transmission channel. The wireless communication unit is further configured to: after receiving the occupation notification, suspend use of the transmission channel to send a network data packet generated by the wireless communication unit to the second communication apparatus.

In a possible design, when suspending use of the transmission channel to send a network data packet generated by the wireless communication unit to the second communication apparatus, the wireless communication unit is specifically configured to allocate a port used for communicating with the second communication apparatus through the transmission channel to the service processing unit.

In a possible design, after the service processing unit enters the working mode, the wireless communication unit is further configured to: modify a second mapping relationship in a stored mapping relationship to the first mapping relationship; or add a first mapping relationship to a stored mapping relationship. The first mapping relationship is an association relationship between first parameter information and an identifier of the service processing unit, the first mapping relationship is used for determining that a communication data packet carrying the first parameter information is processed by the service processing unit, the second mapping relationship is an association relationship between second parameter information and an identifier of the wireless communication unit, and the second mapping relationship is used for determining that a network data packet carrying the second parameter information is processed by the wireless communication unit.

In a possible design, the service processing unit is further configured to: after sending the occupation notification to the wireless communication unit, when determining that the service processing unit does not need to communicate with the second communication apparatus, send an occupation release notification to the wireless communication unit, where the occupation release notification is used for notifying the wireless communication unit that the service processing unit has stopped using the transmission channel. The wireless communication unit is further configured to: after the wireless communication unit receives the occupation release notification, continue to use the transmission channel to send the network data packet generated by the wireless communication unit to the second communication apparatus.

In a possible design, when sending the to-be-sent first network data packet to the second communication apparatus through the transmission channel after the service processing unit enters the working mode, the service processing unit is specifically configured to: encapsulate to-be-sent service data into first-format data, where the first-format data includes data type information, and the data type information indicates a data type of the service data; and encapsulate the first-format data into the first network data packet based on channel information of the transmission channel by using a first network protocol stack, and send the first network data packet to the wireless communication unit. The wireless communication unit is further configured to send the first network data packet to the second communication apparatus.

In a possible design, the channel information of the transmission channel includes one or more of an IP address of the service processing unit, a port number used by the communication apparatus to communicate with the second communication apparatus, a protocol type, an IP address of the second communication apparatus, or a port number of the second communication apparatus.

In a possible design, the IP address of the service processing unit is the same as the IP address of the wireless communication unit.

In a possible design, the wireless communication unit is further configured to: after translating a source address of the first network data packet from address information of the service processing unit into address information of the wireless communication unit, send, through the transmission channel, the first network data packet whose address is translated to the second communication apparatus.

In a possible design, after entering the working mode, the service processing unit is further configured to: receive a second network data packet sent by the second communication apparatus through the transmission channel, where the second network data packet carries the first parameter information; and determine, based on the first parameter information and the first mapping relationship, that the second network data packet is processed by the service processing unit, and send the second network data packet to the service processing unit.

The service processing unit is further configured to decapsulate the second network data packet by using the first network protocol stack.

In a possible design, the wireless communication unit is further configured to translate a destination address of the second network data packet from address information of the wireless communication unit into address information of the service processing unit, and send, based on a translated destination address, the second network data packet whose address is translated to the service processing unit.

In a possible design, before entering the working mode, the service processing unit is further configured to: receive a third network data packet sent by the second communication apparatus through the transmission channel, where the third network data packet carries the second parameter information. The wireless communication unit is further configured to: when determining, based on the second parameter information and the second mapping relationship, that the third network data packet is processed by the wireless communication unit, decapsulate the third network data packet by using a second network protocol stack.

In a possible design, the first parameter information includes one or more of a port number used by the service processing unit to communicate with the second communication apparatus, the IP address of the second communication apparatus, or the port number of the second communication apparatus. The second parameter information includes one or more of a port number used by the wireless communication unit to communicate with the second communication apparatus, the IP address of the second communication apparatus, or the port number of the second communication apparatus.

In a possible design, the wireless communication unit is further configured to encapsulate to-be-sent first communication information into a fourth network data packet based on the channel information of the transmission channel by using the second network protocol stack, and send the fourth network data packet to the second communication apparatus, where the first communication information is used for communicating with the second communication apparatus.

In a possible design, a protocol used for communication between the communication apparatus and the second communication apparatus is a transmission control protocol TCP. After the service processing unit enters the working mode, the service processing unit is further configured to prohibit sending a TCP handshake request message to the second communication apparatus through the transmission channel. Alternatively, the service processing unit is further configured to send a TCP handshake request message to the second communication apparatus after entering the working mode; and the wireless communication unit is further configured to return a TCP handshake acknowledgment message to the service processing unit when receiving a TCP handshake request message sent by the service processing unit to the second communication apparatus.

According to a third aspect, this application provides a communication apparatus, applied to an electronic device or a chip of the electronic device. The apparatus includes at least two processing elements (configured to implement a function of a service processing unit and a function of a wireless communication unit) and at least one storage element. The at least one storage element is configured to store a program and data, and at least one processing element is configured to perform the method in any one of the first aspect or the possible implementations of the first aspect.

According to a fourth aspect, this application provides a communication apparatus, including a processor and an interface circuit. The interface circuit is configured to receive a signal from another communication apparatus other than the communication apparatus and transmit the signal to the processor, or send a signal from the processor to another communication apparatus other than the communication apparatus. The processor is configured to implement functions of a service processing unit and a wireless communication unit, and may be specifically configured to implement the method according to any one of the first aspect or the possible implementations of the first aspect by using a logical circuit or by executing code instructions.

According to a fifth aspect, this application provides a computer program product. The computer program product includes computer instructions. When the computer instructions are executed, the method according to any one of the first aspect or the possible implementations of the first aspect is performed.

According to a sixth aspect, this application provides a computer-readable storage medium. The computer storage medium stores computer instructions. When the computer instructions are executed, the method according to any one of the first aspect or the possible implementations of the first aspect is performed.

DESCRIPTION OF EMBODIMENTS

Figure 1:
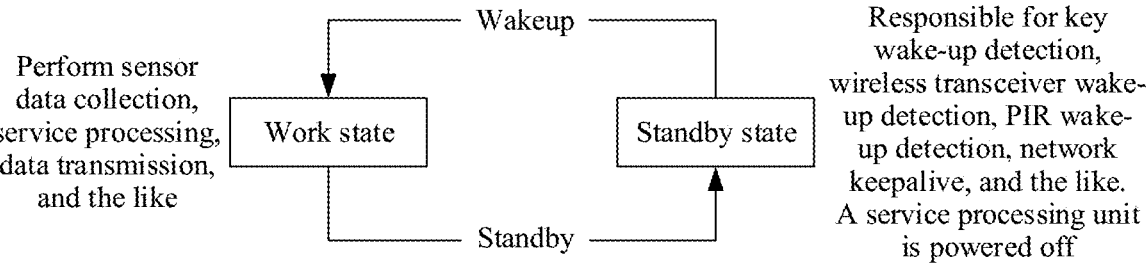
FIG. 1 is a schematic diagram of state switching according to an embodiment of this application.

The following further describes in detail embodiments of this application with reference to accompanying drawings.

Embodiments of this application may be applied to a first communication apparatus powered by a battery. It should be understood that the communication apparatus powered by the battery may include an apparatus that is completely powered by a battery, or an apparatus that is partially powered by a battery, for example, an apparatus that is powered by both a mains supply and a battery. The mains supply may be supplying power by using a power adapter. The first communication apparatus can perform wireless communication. Wireless communication may include a 3G network, a 4G network, a 5G network, or a future 6G network, or may communicate by using a wireless fidelity (Wi-Fi) network, Bluetooth, or the like. The first communication apparatus may be a terminal device powered by a battery. The terminal device powered by the battery may be a battery-powered photography device (which may also be referred to as a battery-powered camera device), for example, a camera, a video camera, or a video recorder, or may be a battery-powered terminal device that can perform wireless communication, for example, a child early education machine or a wearable terminal device.

The first communication apparatus includes a service processing unit and a wireless communication unit. The first communication apparatus may further include a microprocessing control unit (MCU). The first communication apparatus may further include another component such as a sensor.

The service processing unit is responsible for processing services. The battery-powered camera device is used as an example. The battery-powered camera device is configured to capture, encode, and store audio/video, and send encoded bitstream data to a wireless communication chip for transmission. The service processing unit is usually in a nonworking state (a power-off state or a standby state, and a power-off state is used as an example in the following description), and is powered on or woken up by the MCU as required to process a service. Because the first communication apparatus is powered by the battery, to save power, a power-on working time of the service processing unit is usually short. Generally, a memory of the service processing unit is 16 MB or larger, and a memory that can be used by applications is sufficient.

The MCU, as a main control unit, is responsible for overall control of the first communication apparatus, including control of the wireless communication unit, power-on and power-off control of the service processing unit, capturing and processing of another peripheral sensor, and the like. If the first communication apparatus is in the standby state, the MCU is generally in an always-on state.

The wireless communication unit is mainly configured to receive and send wireless network data. When the first communication apparatus is in a working state, a wireless communication chip is generally in an always-on state. It should be noted that, if the first communication apparatus includes an MCU chip, when the first communication apparatus is in the standby state, the wireless communication chip, like the service processing chip, may not be in an always-on state. A memory on a wireless communication unit side is generally hundreds of KBs, and an available memory is generally dozens of KBs to hundreds of KBs.

As mentioned above, the first communication apparatus is in the working state. In addition to the working state, the first communication apparatus may alternatively be in the standby state. Refer to FIG. 1. When a first communication apparatus is in a working state, the first communication apparatus performs sensor data collection, service processing, data transmission, and the like. The first communication apparatus is in a power-on state. After receiving a standby instruction, the first communication apparatus is in a standby state. In the standby state, the first communication apparatus may be responsible for key-based wake-up detection, wireless transceiver wake-up detection, PIR wake-up detection, network keepalive, and the like. In the standby state, to reduce power consumption, a service processing unit is in a power-off state, and a wireless communication unit and/or an MCU is in a low-power working state. After receiving a wake-up instruction, the first communication apparatus in the standby state enters the working state.

Figure 2:
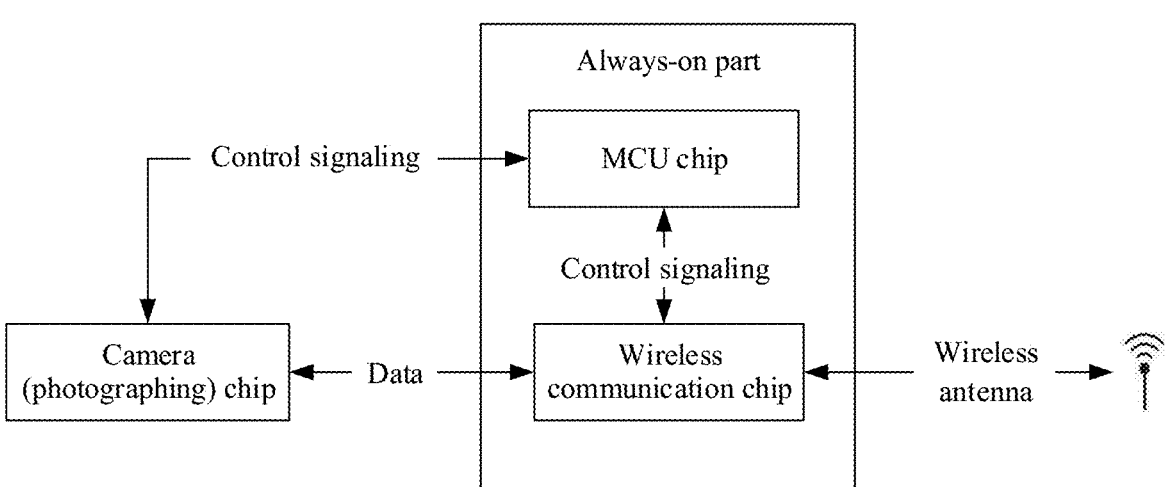
FIG. 2 is a schematic diagram of a possible structure of an electronic device according to an embodiment of this application.

In a possible manner, the service processing unit, the wireless communication unit, and the MCU are separately deployed on different chips. A battery-powered camera device is used as an example, and may generally include a camera chip, a wireless communication chip, and an MCU chip, as shown in FIG. 2. The camera chip may include one or more service processing units, and is mainly configured to process a camera-related service. The wireless communication chip may include one or more wireless communication units, and is mainly configured to receive and send wireless network data. The MCU chip, as a main control unit, is responsible for overall control of the camera device, including control of the wireless communication chip and the camera chip. The wireless communication chip and the MCU chip belong to an always-on part.

In another possible manner, the wireless communication unit and the MCU are deployed on a same chip. A battery-powered camera device is still used as an example, and may generally include a camera chip and a wireless communication chip. The wireless communication chip performs functions of the wireless communication unit and a single-chip microcomputer processing unit. When a plurality of sensors need to be connected, a number of pins on the wireless communication chip may not be sufficient to meet the requirements of the quantity of sensors that need to be connected. An MCU chip may further be added to the battery-powered camera device to connect to the sensor and manage the plurality of sensors. As an optional component, the MCU chip is determined, based on a requirement, whether to be disposed in the battery-powered camera device.

Figure 3:
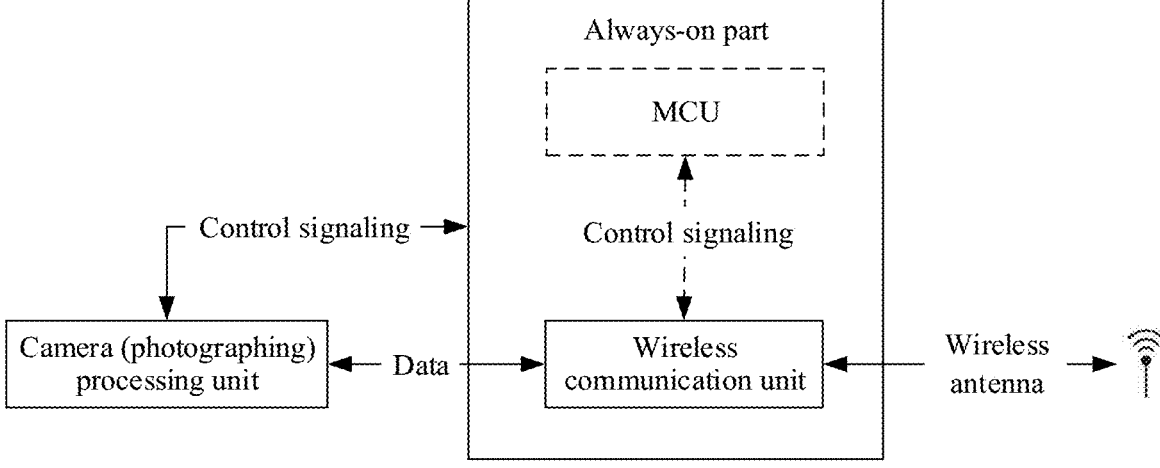
FIG. 3 is a schematic diagram of another possible structure of an electronic device according to an embodiment of this application.

In still another possible manner, the wireless communication unit, the MCU, and the service processing unit may all be deployed on one chip. In an example, functions of the MCU may also be integrated into the wireless communication unit. Refer to FIG. 3. The wireless communication unit may be used as an always-on part to perform control of an entire first communication apparatus, receiving and sending of wireless data, network keepalive with a server, and the like. An MCU is optional and can be added as required. When a plurality of sensors need to be connected and the number of pins on chip are not sufficient to meet requirements of quantity of sensors that need to be connected, an MCU is added.

It should be noted that the wireless communication unit, the MCU, and a service processing unit may all be implemented by a processor. For example, the processor may include one or more of a central processing unit (CPU), a graphics processing unit (GPU), an image signal processor (ISP), a digital signal processor (DSP), or a neural processing unit (NPU).

Figure 4:
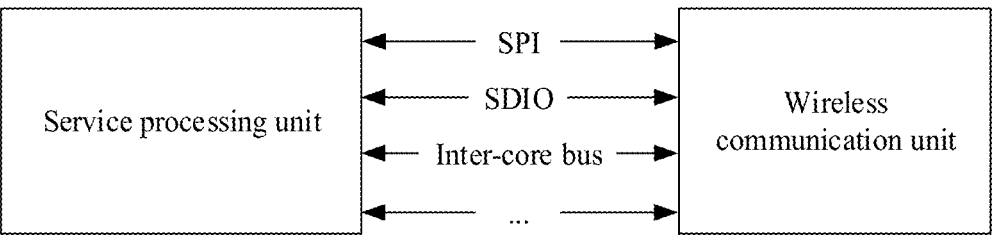
FIG. 4 is a schematic diagram of a communication connection according to an embodiment of this application.

Refer to FIG. 4. A service processing unit and a wireless communication processing unit may be connected through a hardware interconnection bus. The hardware interconnection bus may include a serial peripheral interface (SPI), a secure digital input and output (SDIO) card, an inter-core bus, or the like. It should be noted that the inter-core bus scenario is applicable to a case in which the service processing unit and the wireless communication unit share a same chip. The service processing unit and the wireless communication unit are directly connected through a system bus, and may directly access a storage unit of each other.

Figure 5:
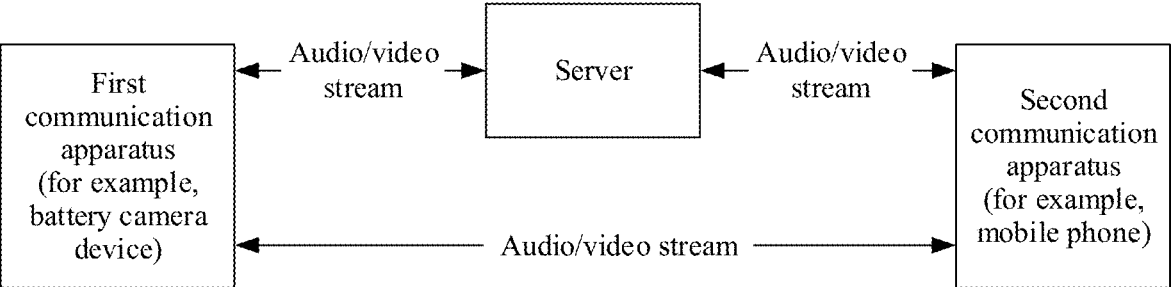
FIG. 5 is a schematic diagram of an architecture of a communication system according to an embodiment of this application.

FIG. 5 is a schematic diagram of a possible architecture of a communication system. The communication system includes the foregoing first communication apparatus, and further includes a second communication apparatus. The second communication apparatus may be a terminal device or a server. When the second communication apparatus is the terminal device, the terminal device may be a battery terminal device, or may be a terminal device powered by a power supply, for example, may be a mobile phone, a tablet computer, or a wearable device (for example, a smartwatch) having a wireless communication function. The second communication apparatus may alternatively be a vehicle-mounted terminal, a laptop, or the like. It should be further understood that the terminal device in embodiments of this application may alternatively be a desktop computer, a smart television, or the like. This is not limited. A power supply type of the second communication apparatus is not specifically limited in this application. Certainly, the communication system may further include another electronic device. A quantity of communication apparatuses (the first communication apparatus and the second communication apparatus) included in the communication system is not limited in embodiments of this application. When the second communication apparatus is the terminal device, the communication system may further include a server. The server in embodiments of this application may be a router, an access network device (namely, a base station), a cloud server, or the like.

In a possible implementation, when the second communication apparatus is a server, the first communication apparatus and the second communication apparatus create a transmission channel, for example, may be a message queuing telemetry transport (MQTT) protocol connection, a constrained application protocol (CoAP) connection, or a transmission control protocol (TCP) connection.

In another possible implementation, the second communication apparatus is the terminal device, for example, the first communication apparatus is a battery-powered camera device, and the second communication apparatus is a mobile phone. When audio and video code streams are transmitted between the first communication apparatus and the second communication apparatus, the audio and video code streams may be relayed by using a server that provides a service. Alternatively, a directly connected transmission channel, for example, a P2P channel, may be established. The audio and video streams are transmitted through the directly connected transmission channel. The directly connected transmission channel may be a directly connected network connection established between the communication apparatuses, and may be implemented by a socket connection channel.

The P2P channel is established between the first communication apparatus and the second communication apparatus by using a hole punching technology. Then, data is exchanged through the established P2P channel. In the following descriptions, the P2P channel is used as an example. The P2P channel may also be referred to as a P2P connection, or P2P for short.

Figure 6:
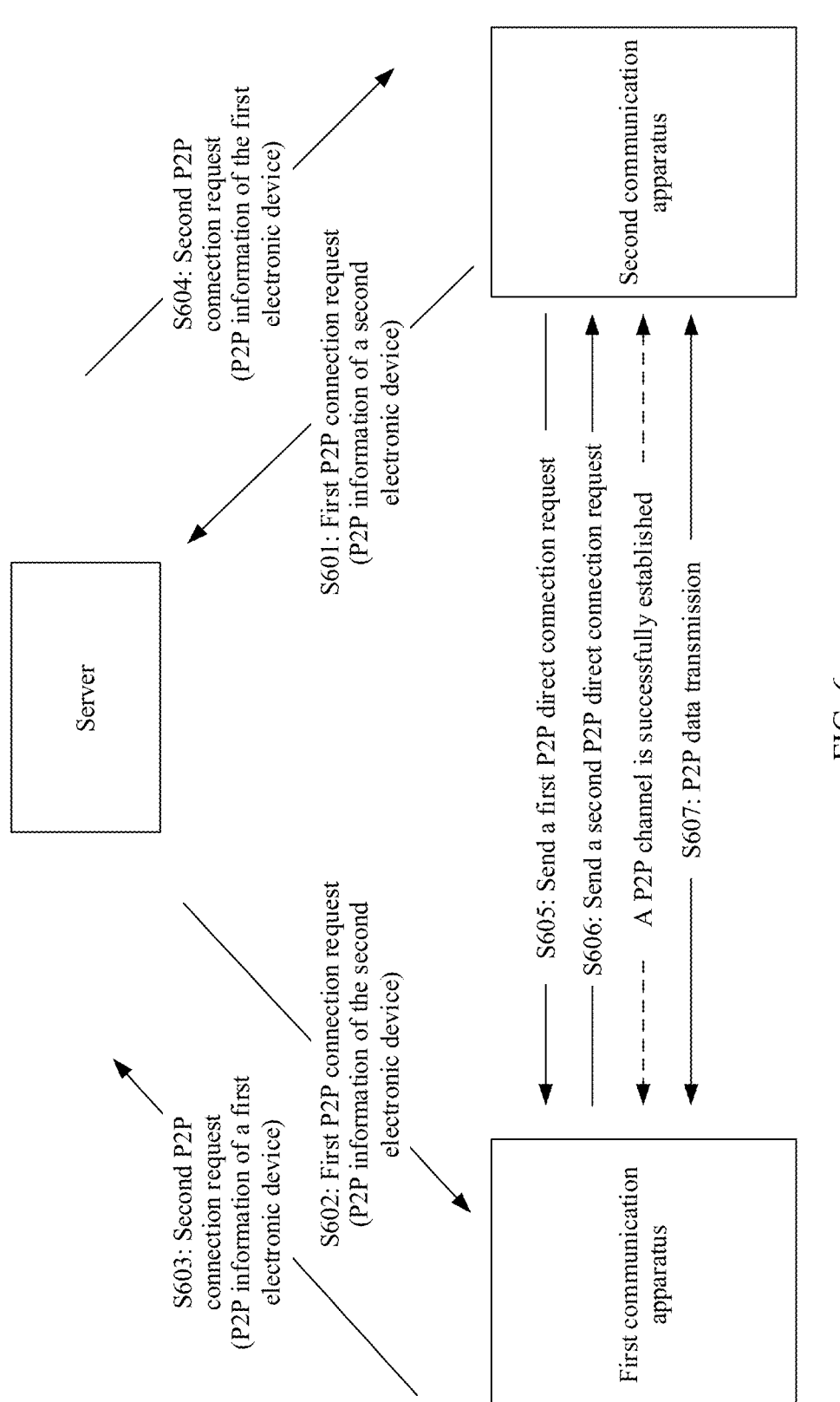
FIG. 6 is a schematic flowchart of P2P hole punching according to an embodiment of this application.

FIG. 6 is a schematic flowchart of hole punching between a first communication apparatus and a second communication apparatus. In FIG. 6, an example in which the second communication apparatus initiates a hole punching request is used.

S601: The second communication apparatus sends a first P2P connection request to a server. The first P2P connection request carries P2P information of the second communication apparatus. The P2P information of the second communication apparatus may include a port number and/or an IP address of the second communication apparatus.

S602: The server sends the first P2P connection request to the first communication apparatus.

S603: After receiving the first P2P connection request, the first communication apparatus saves the P2P information of the second communication apparatus, and initiates a second P2P connection request to the server. The second P2P connection request carries P2P information of the first communication apparatus. The P2P information of the first communication apparatus may include a port number and/or an IP address of the first communication apparatus.

S604: After receiving the second P2P connection request, the server sends the second P2P connection request to the second communication apparatus.

S605: After receiving the P2P information of the first communication apparatus, the second communication apparatus sends a first P2P direct connection request to the first communication apparatus based on the P2P information of the first communication apparatus.

S606: After receiving the first P2P direct connection request sent by the second communication apparatus, the first communication apparatus initiates a second P2P direct connection request to the second communication apparatus based on the P2P information of the second communication apparatus.

Therefore, a P2P channel is successfully established between the first communication apparatus and the second communication apparatus.

S607: The first communication apparatus exchanges data with the second communication apparatus through the P2P channel.

It should be noted that FIG. 6 merely describes an example of a hole punching process between two electronic devices to establish the P2P channel, and the process is not specifically limited. In an actual application, for a process of performing P2P hole punching between electronic devices to establish a P2P channel, reference may be made to but is not limited to the specification RFC3489.

The P2P information sent when hole punching is performed between the first communication apparatus and the second communication apparatus needs to be encapsulated into an IP packet before being sent. Therefore, an IP stack needs to be deployed in the first communication apparatus powered by a battery. The IP stack may also be referred to as a network protocol stack, used for encapsulating an IP packet. In subsequent descriptions, an example in which the first communication apparatus is a battery-powered camera device is used.

Figure 7:
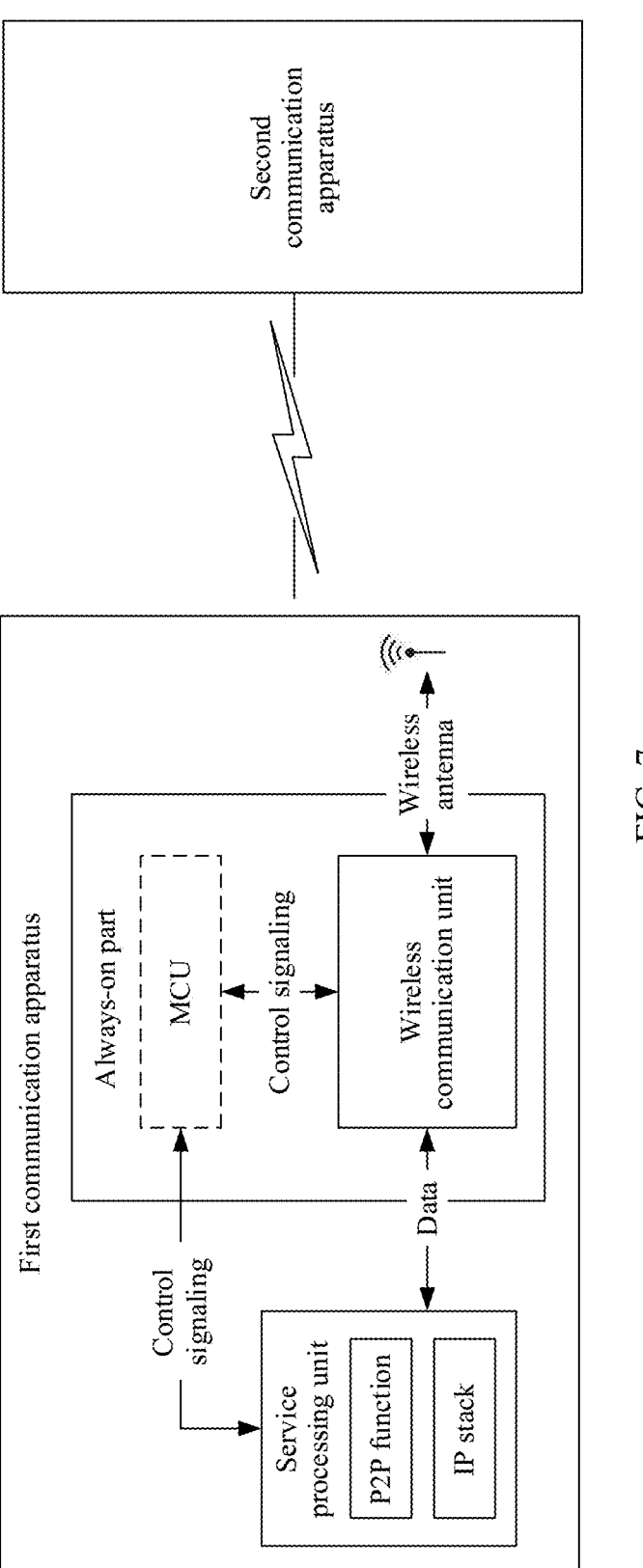
FIG. 7 is a schematic diagram of a possible deployment manner of a network protocol stack and a P2P function according to an embodiment of this application.

For a possible deployment architecture, refer to FIG. 7. An IP stack and a P2P function are both deployed on a service processing unit. In this deployment manner, a P2P hole punching process can be started only after the service processing unit is powered on, and the P2P hole punching process is complex. The service processing unit can perform data transmission with the second communication apparatus only after the hole punching succeeds. Consequently, timeliness of data transmission from the first communication apparatus end to the second communication apparatus is affected.

Figure 8:
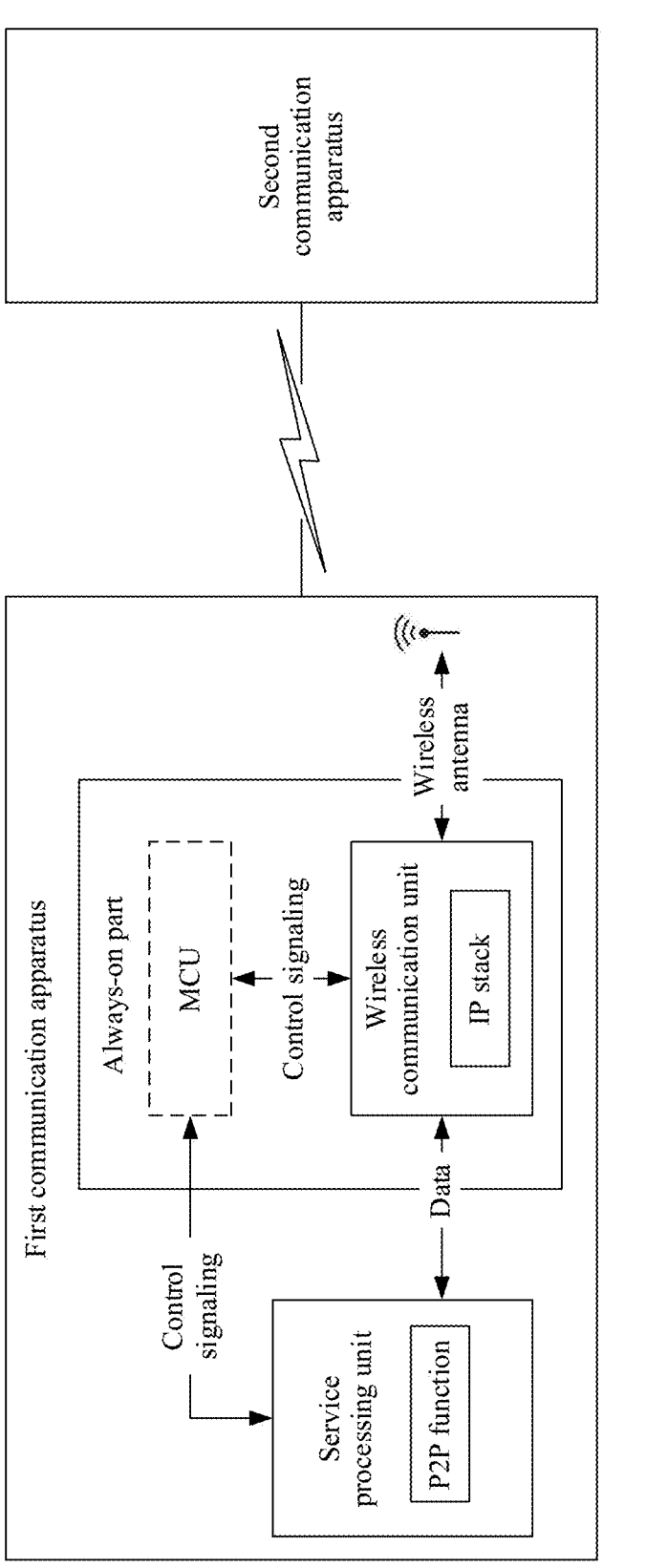
FIG. 8 is a schematic diagram of another possible deployment manner of a network protocol stack and a P2P function according to an embodiment of this application.

For another possible deployment architecture, refer to FIG. 8. An IP stack is deployed on a wireless communication unit, and a P2P function is deployed on a service processing unit. In this deployment manner, a P2P hole punching process can be started only after the service processing unit is powered on, and the P2P hole punching process is complex. The service processing unit can perform data transmission with the second communication apparatus only after the hole punching succeeds. Consequently, timeliness of data transmission from the first communication apparatus end to the second communication apparatus is affected.

Figure 9:
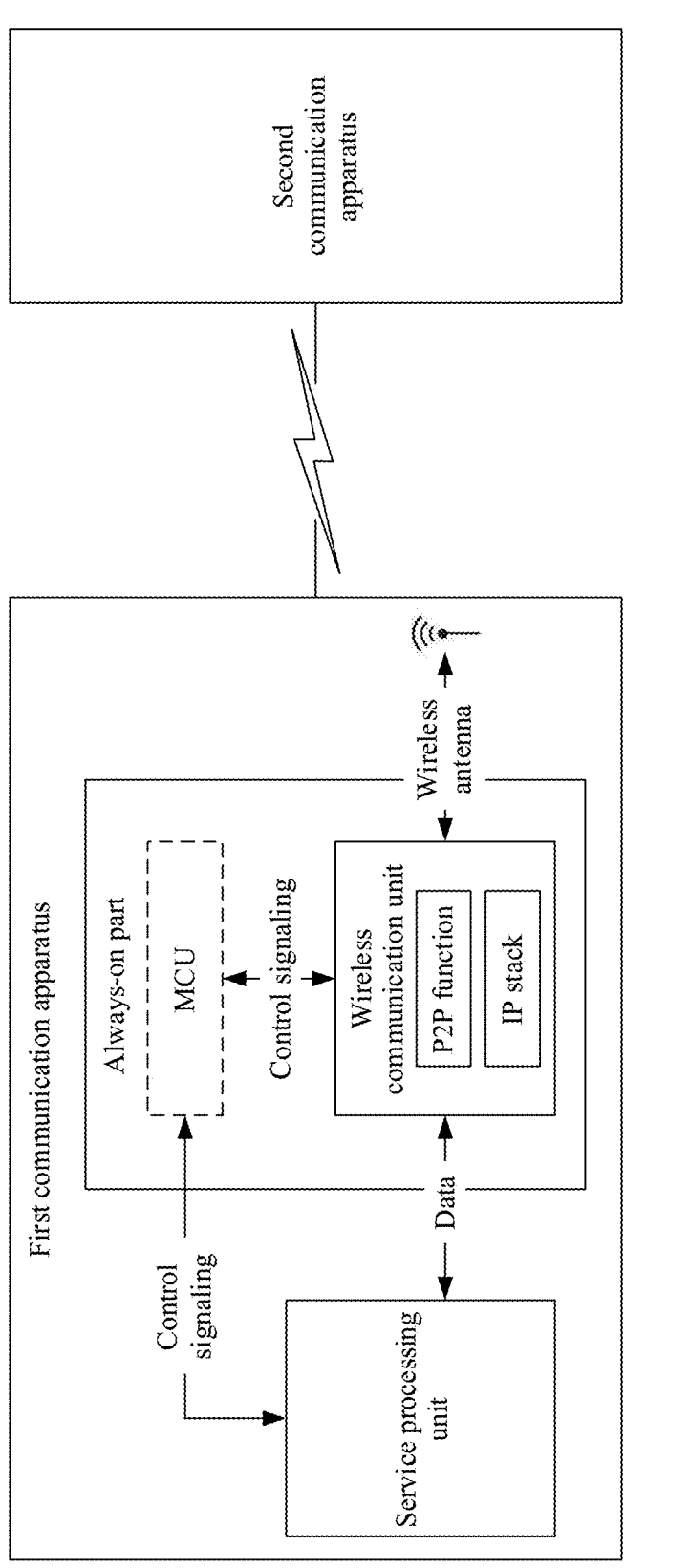
FIG. 9 is a schematic diagram of still another possible deployment manner of a network protocol stack and a P2P function according to an embodiment of this application.

In still another possible deployment architecture, refer to FIG. 9. Both an IP stack and a P2P function are deployed on a wireless communication unit. When being in a power-on state, the service processing unit collects a video stream, and sends the video stream to a wireless communication unit, so that the wireless communication unit encapsulates the received video stream into an IP packet and sends the IP packet to the service device.

On one hand, an available memory on the wireless communication unit is small, usually ranging from dozens of KBs to hundreds of KBs, and an application having a large memory requirement cannot be deployed on the wireless communication unit. For example, if a real-time streaming transmission protocol (RTSP) service is deployed on the wireless communication unit, and the service processing unit directly sends a video I frame (for example, the frame is 150 KBs) to the wireless communication unit. In this case, transmission may fail due to insufficient memory. In addition, network retransmission functions such as transmission control protocol (TCP) retransmission and P2P retransmission all require large memory space. If memory space is insufficient and packet loss occurs, retransmitted data packets cannot be obtained. This causes service interruption.

On the other hand, currently, a network service related to audio/video is generally deployed on the service processing unit, for example, an audio/video stream pushing or a network intercom service. If the network protocol stack is deployed on the wireless communication unit, re-adapting these network services takes a heavy workload. In addition, a CPU processing capability of the wireless communication unit is weak, and a CPU frequency generally ranges from dozens of megabytes to hundreds of megabytes. If some processing of the RTSP/P2P service is transferred to the wireless communication unit, for example, unpacking of a audio/video data stream, data encryption and decryption, network retransmission processing, and the like are transferred to the wireless communication unit, load on the wireless communication unit is heavy. The processing load of the wireless communication unit is further increased. As a result, a throughput of wireless communication is reduced.

In embodiments of this application, "at least one" means one or more, and "a plurality of" means two or more than two. The term "and/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following items (pieces)" or a similar expression thereof indicates any combination of these items, including a single item (piece) or any combination of a plurality of items. For example, at least one item of a, b, or c may represent: a, b, c, a and b, a and c, b and c, or a, b, and c, where a, b, and c may be singular or plural. In addition, it should be understood that in the descriptions of this application, terms such as "first" and "second" are merely used for distinguishing and description, but should not be understood as an indication or implication of relative importance, or should not be understood as an indication or implication of a sequence. Numerals used in embodiments of this application are merely used for differentiation for ease of description, but do not limit the scope of embodiments of this application. The sequence numbers of the foregoing processes do not mean an execution sequence, and the execution sequence of the processes should be determined based on functions and internal logic of the processes.

In view of this, embodiments of this application provide a communication method and apparatus. A network protocol stack is deployed on each of a service processing unit and a wireless communication unit, and the service processing unit and the wireless communication unit each are responsible for encapsulation of their own data packets. The wireless communication unit is responsible for channel establishment, that is, the wireless communication unit has a channel establishment function, and the service processing unit is deployed with a P2P data transmission function. In this deployment manner, before the service processing unit enters a working mode, the wireless communication unit establishes a transmission channel between a first communication apparatus and a second communication apparatus. After entering the working mode, the service processing unit may inherit and use the transmission channel established by the wireless communication unit to transmit data to the second communication apparatus. The method and an apparatus are based on a same inventive concept. Because the method and the apparatus have a similar problem-resolving principle, for implementations of the apparatus and the method, refer to each other, and no repeated description is provided.

Figure 10:
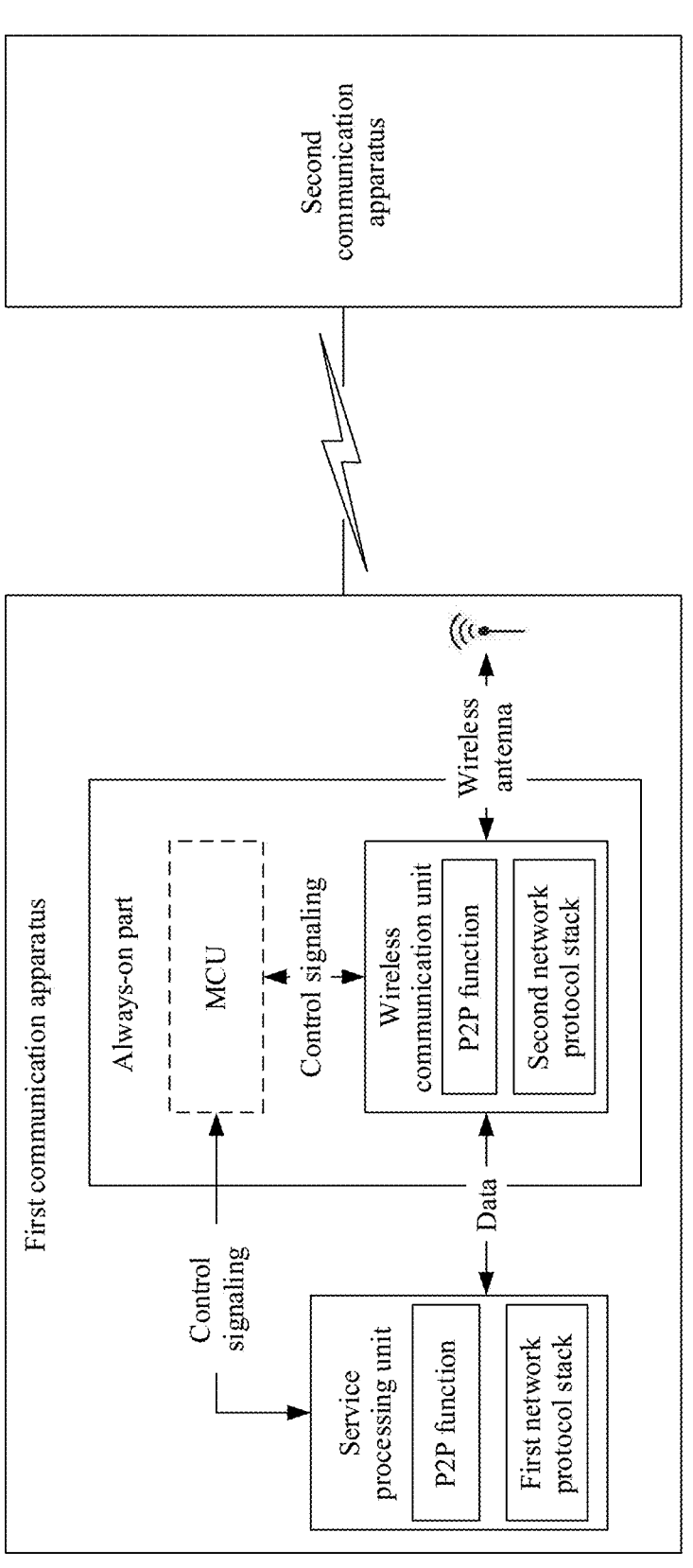
FIG. 10 is a schematic diagram of another architecture of a communication system according to an embodiment of this application.

FIG. 10 is a schematic diagram of an architecture of a communication system according to an embodiment of this application. A network protocol stack and a P2P function are deployed on each of a service processing unit and a wireless communication unit of a first communication apparatus. For ease of differentiation, a network protocol stack deployed on the wireless communication unit is referred to as a second network protocol stack. A network protocol stack deployed on the service processing unit is referred to as a first network protocol stack. A network protocol may be a transmission control protocol/internet protocol (TCP/IP), a user datagram protocol (UDP), or the like.

Figure 11:
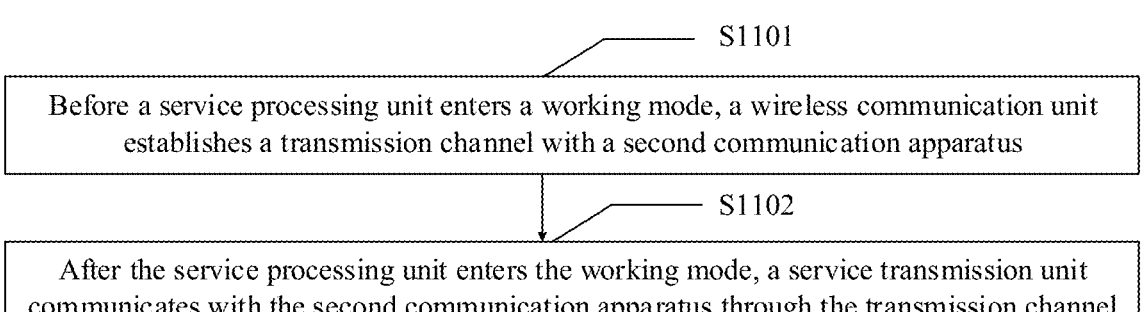
FIG. 11 is a schematic flowchart of a communication method according to an embodiment of this application.

FIG. 11 is a schematic flowchart of a communication method according to an embodiment of this application. A P2P channel is used as an example.

S1101: Before a service processing unit enters a working mode, a wireless communication unit establishes a transmission channel with a second communication apparatus.

S1102: After the service processing unit enters the working mode, a service transmission unit communicates with the second communication apparatus through the transmission channel.

That the service processing unit enters the working mode may be: The service processing unit is powered on, or the service processing unit is woken up from a standby state.

For example, after the service processing unit enters the working mode and before the service processing unit communicates with the second communication apparatus through the transmission channel, the service processing unit may first take over the transmission channel (or inherit the transmission channel). That is, when the service processing unit uses the transmission channel, the wireless communication unit does not use the transmission channel. In an optional case, after the wireless communication unit establishes the transmission channel, and after the service processing unit enters the working mode, the wireless communication unit may notify the wireless communication unit that the transmission channel between the wireless communication unit and the second communication apparatus has been established, so that the service processing unit can take over the transmission channel.

The service transmission unit may take over the transmission channel in the following manner:

In a possible manner, the wireless communication unit passively releases the transmission channel.

After entering the working mode, the service processing unit may send an occupation notification to the wireless communication unit, where the occupation notification is used for notifying that the transmission channel is occupied by the service processing unit. Further, after receiving the occupation notification, the wireless communication unit suspends use of the transmission channel. Specifically, that the wireless communication unit suspends use of the transmission channel may be: The wireless communication unit suspends sending, through the transmission channel, a network data packet generated by the wireless communication unit to the second communication apparatus.

In an example, for a service-related network data packet that is sent by the second communication apparatus through the transmission channel, the wireless communication unit forwards, based on a mapping relationship, the service-related network data packet to the service processing unit for processing.

Related descriptions of the mapping relationship are described in detail subsequently, and details are not described herein.

For example, the wireless communication unit suspends use of the transmission channel, and may allocate a port used for communicating with the second communication apparatus to the service processing unit.

In another possible manner, the wireless communication unit actively releases the transmission channel.

After waking up the wireless communication unit, the service processing unit may actively suspend use of the transmission channel. Specifically, the service processing unit suspends use of the transmission channel to send a network data packet generated by the wireless communication unit to the second communication apparatus.

In an example, for a service-related network data packet that is sent by the second communication apparatus through the transmission channel, the wireless communication unit may forward, based on a mapping relationship, the service-related network data packet to the service processing unit for processing.

In a possible implementation, the service transmission unit takes over the transmission channel, and the wireless communication unit may further process a stored mapping relationship. For example, the wireless communication unit modifies a second mapping relationship in the stored mapping relationship to a first mapping relationship. Alternatively, the wireless communication unit adds a first mapping relationship to the stored mapping relationship.

The first mapping relationship is an association relationship between first parameter information and an identifier of the service processing unit. The first mapping relationship is used for determining that a communication data packet carrying the first parameter information is processed by the service processing unit. The second mapping relationship is an association relationship between second parameter information and an identifier of the wireless communication unit. The second mapping relationship is used for determining that a network data packet carrying the second parameter information is processed by the wireless communication unit.

Use of the mapping relationship is described in detail subsequently, and details are not described herein.

In a possible implementation, that the service transmission unit communicates with the second communication apparatus through the transmission channel may include:

The service processing unit sends a to-be-sent network data packet to the second communication apparatus through the transmission channel. For example, the service processing unit encapsulates to-be-sent service data on the service processing unit into first-format data by using a data transmission function. The first-format data carries data type information, and the data type information indicates a data type of the service data. The first-format data may conform to a format of a network protocol used by a first network protocol stack. Then, after encapsulating the first-format data into a first network data packet based on channel information of the transmission channel by using the first network protocol stack, the service processing unit sends the first network data packet to the wireless communication unit. Then, the wireless communication unit sends the first network data packet to the second communication apparatus.

After the service processing unit enters the working mode, the wireless communication unit receives the network data packet from the second communication apparatus, and forwards the network data packet to the service processing unit for processing. The service processing unit may decapsulate, by using the first network protocol stack, the received network data packet forwarded by the wireless communication unit.

The channel information of the transmission channel may include address information of the second communication apparatus. The address information includes an IP address and/or a port number. The channel information may further include one or more of an IP address, a port number, and a protocol type that are of the service processing unit. In this embodiment of this application, the IP address of the service processing unit may be the same as or different from an IP address of the wireless communication unit. This part is subsequently described in detail, and details are not described herein.

The service processing unit may obtain the address information of the second communication apparatus in the following manner:

In an example, after the service processing unit sends the occupation notification to the wireless communication unit, the wireless communication unit receives the occupation notification, and may send the address information of the second communication apparatus to the service processing unit.

In another example, after establishing the transmission channel and waking up the service processing unit, the wireless communication unit may send the address information of the second communication apparatus to the service processing unit.

In still another example, after entering the working mode, the service processing unit may actively obtain the address information of the second communication apparatus from the wireless communication unit. For example, a first obtaining request is sent, where the first obtaining request is used for requesting the address information of the second communication apparatus.

In this embodiment of this application, before the service processing unit takes over the transmission channel, the wireless communication unit occupies the transmission channel. For example, when the service processing unit is in the standby mode, the wireless communication unit occupies the transmission channel. That the service processing unit is in the standby mode may be: The service processing unit is in a power-off state or the service processing unit is in a low-power standby. In the low-power standby state, the service processing unit does not transmit or process a service data packet.

When the service processing unit does not need to communicate with the second communication apparatus, the service processing unit does not occupy the transmission channel. In this case, the wireless communication unit may continue to use the transmission channel. For example, when the service processing unit is about to be powered off, the service processing unit may send an occupation release notification to the wireless communication unit. The occupation release notification is used for notifying the wireless communication unit that the service processing unit does not use the transmission channel. For another example, if there is no to-be-sent service data on the service processing unit, sending of a network data packet that encapsulates service data is finished, and the second communication apparatus also successfully receives the network data packet, the service processing unit may send an occupation release notification to the wireless communication unit.

After the wireless communication unit receives the occupation release notification, the wireless communication unit may take over the transmission channel. In this way, the wireless communication unit can use the transmission channel to send the network data packet generated by the wireless communication unit to the second communication apparatus. The wireless communication unit decapsulates and processes, by using a second network protocol stack, the network data packet sent by the second communication apparatus through the transmission channel.

With reference to the foregoing descriptions, regardless of whether the wireless communication unit takes over the transmission channel or the service processing unit takes over the transmission channel, the network data packet sent by the second communication apparatus through the transmission channel is first received by the wireless communication unit. The wireless communication unit determines that the network data packet is distributed to the wireless communication unit for processing or distributed to the service processing unit for processing.

After the wireless communication unit establishes the transmission channel and before the service processing unit enters the working mode, the wireless communication unit takes over the transmission channel. The wireless communication unit stores the second mapping relationship. The second mapping relationship is the association relationship between the identifier of the wireless communication unit and the second parameter information used for communicating with the second communication apparatus. After the service processing unit enters the working mode, the wireless communication unit stores the first mapping relationship. The first mapping relationship is a mapping relationship between the identifier of the service processing unit and the first parameter information used for communicating with the second communication apparatus.

After the service processing unit enters the working mode, the service processing unit takes over the transmission channel, and the wireless communication unit may further perform the following operations:

For example, the wireless communication unit adds the first mapping relationship to the stored mapping relationship, or may delete the second mapping relationship in the stored mapping relationship. For another example, the wireless communication unit may modify the second mapping relationship in the stored mapping relationship to the first mapping relationship.

The second parameter information used for communicating with the second communication apparatus may include, for example, one or more of a port number used by the wireless communication unit to communicate with the second communication apparatus, the IP address of the second communication apparatus, or the port number of the second communication apparatus.

The first parameter information used for communicating with the first communication apparatus may include, for example, one or more of a port number used by the service processing unit to communicate with the second communication apparatus, the IP address of the second communication apparatus, or the port number of the second communication apparatus.

The port number used by the wireless communication unit to communicate with the second communication apparatus and the port number used by the service processing unit to communicate with the second communication apparatus may be the same or different.

For example, the port number used by the wireless communication unit to communicate with the second communication apparatus and the port number used by the service processing unit to communicate with the second communication apparatus are the same. The service processing unit takes over the transmission channel. The wireless communication unit may further allocate the port used for communicating with the second communication apparatus to the service processing unit. For example, the wireless communication unit disables a port that is on a local side and that is for communicating with the second communication apparatus, and enables a port that is on a service processing unit side and that is for communicating with the second communication apparatus. Therefore, the port used for communicating with the second communication apparatus is only used by the service processing unit. For example, the first mapping relationship may include an association relationship between the port number and the identifier of the service processing unit. The second mapping relationship may include an association relationship between the port number and the identifier of the wireless communication unit.

The port number used by the wireless communication unit to communicate with the second communication apparatus and the port number used by the service processing unit to communicate with the second communication apparatus are different. The service processing unit takes over the transmission channel. The wireless communication unit may further disable the port used by the wireless communication unit to communicate with the second communication apparatus, and enable the port used by the service processing unit to communicate with the second communication apparatus.

During deployment of a communication system architecture, a possible deployment manner is: The service processing unit and the wireless communication unit may share a same IP address. For example, a deployment manner of a variant bridge is used. The variant bridge is a manner similar to a deployment manner of a bridge. A difference lies in that the service processing unit and the wireless communication unit share the same IP address. If the service processing unit and the wireless communication unit are deployed on the communication apparatus in a bridge manner, the IP address of the service processing unit is different from the IP address of the wireless communication unit.

In this deployment manner, the identifier of the service processing unit may be an ID of the service processing unit, and the identifier of the wireless communication unit may be an ID of the wireless communication unit. In another possible deployment manner, the service processing unit and the wireless communication unit may use different IP addresses. For example, a NAT deployment manner is used. In this deployment manner, the identifier of the service processing unit may include one or more of an ID of the service processing unit or the IP address of the service processing unit. The identifier of the wireless communication unit may include one or more of an ID of the wireless communication unit or the IP address of the wireless communication unit.

The wireless communication unit receives, through the transmission channel, the network data packet sent by the second communication apparatus. The network data packet carries an indication parameter used for determining whether the network data packet is processed by the wireless communication unit or distributed to the service processing unit for processing. For example, when the indication parameter is the first parameter information, it is determined that the network data packet is processed by the service processing unit. When the indication parameter is the second parameter information, it is determined that the network data packet is processed by the wireless communication unit. In this way, the wireless communication unit determines, based on the indication parameter and the stored mapping relationship, whether the network data packet is processed by the service processing unit or the wireless communication unit.

In an example, after the service processing unit enters the working mode, the wireless communication unit receives a network data packet 1 from the second communication apparatus through the transmission channel, where the network data packet 1 carries the first parameter information. The wireless communication unit determines, based on the first parameter information and the first mapping relationship, that the network data packet 1 is processed by the service processing unit, and sends the network data packet 1 to the service processing unit. The service processing unit decapsulates the network data packet 1 by using the first network protocol stack.

In another example, before the service processing unit enters the working mode, the wireless communication unit receives a network data packet 2 from the second communication apparatus through the transmission channel, where the network data packet 2 carries the second parameter information. When the wireless communication unit determines, based on the second parameter information and the second mapping relationship, that the network data packet 2 is processed by the wireless communication unit, the wireless communication unit decapsulates the third network data packet by using the second network protocol stack.

The mapping relationships may be stored in a form of a linked list, or in a form of an array, or in another storage form. This is not limited in this embodiment of this application.

The following describes in detail the solutions provided in this application with reference to a deployment manner of a communication system.

The following describes in detail a solution in which the service processing unit and the wireless communication unit may share a same IP address.

Figure 12:
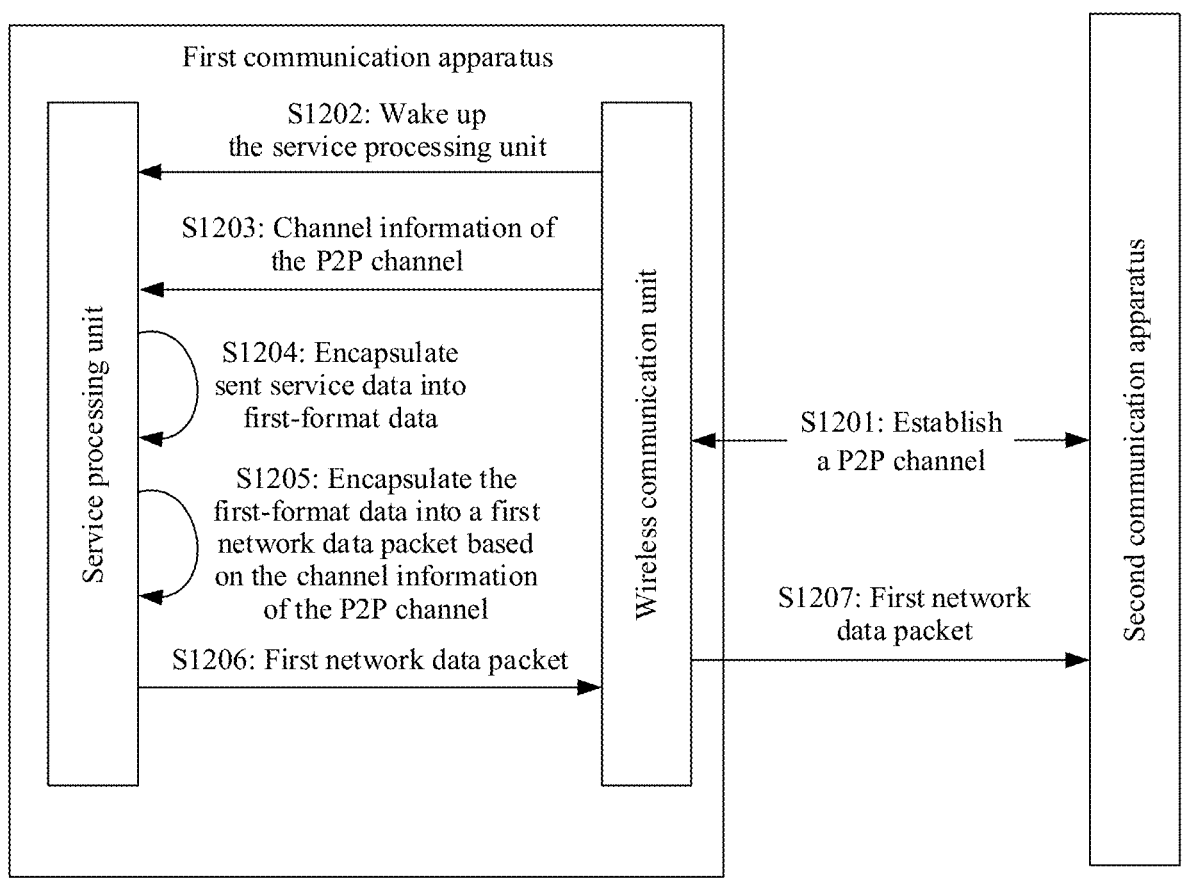
FIG. 12 is a schematic flowchart of another communication method according to an embodiment of this application.

FIG. 12 is a schematic flowchart of a communication method according to an embodiment of this application. For example, a second communication apparatus is a terminal device, and a transmission channel is a P2P channel.

S1201: A wireless communication unit of a first communication apparatus establishes the P2P channel with the second communication apparatus by using a P2P hole punching technology. For a specific manner of establishing the P2P channel, refer to FIG. 6. Details are not described herein again.

For example, the first communication apparatus is a battery-powered camera device, and the second communication apparatus is a mobile phone. After starting an application used for connecting to the battery-powered camera device, the mobile phone may initiate a P2P connection request to the battery-powered camera device via a P2P server.

Information related to hole punching transmitted by the wireless communication unit to the second communication apparatus or the P2P server may be encapsulated or decapsulated by using a second network protocol stack on the wireless communication unit.

S1202: The wireless communication unit of the first communication apparatus wakes up a service processing unit. The service processing unit enters a working mode.

The wireless communication unit may receive a wake-up instruction sent by the second communication apparatus, and wake up the service processing unit. Alternatively, the service processing unit may be woken up by using a local wake-up instruction. Alternatively, the service processing unit may be powered on, to be woken up.

S1203: The wireless communication unit sends channel information of the P2P channel to the service processing unit, and the service processing unit takes over the P2P channel. An operation in which the service processing unit takes over the P2P channel is described above, and details are not described herein again.

S1204: The service processing unit encapsulates sent service data into first-format data. The first-format data includes data type information. The data type information indicates a data type of the service data.

S1205: The service processing unit encapsulates, based on the channel information of the P2P channel, the first-format data into a first network data packet by using a first network protocol stack.

S1206: The service processing unit sends the first network data packet to the wireless communication unit.

S1207: The wireless communication unit sends the first network data packet to the second communication apparatus.

Figure 13A:
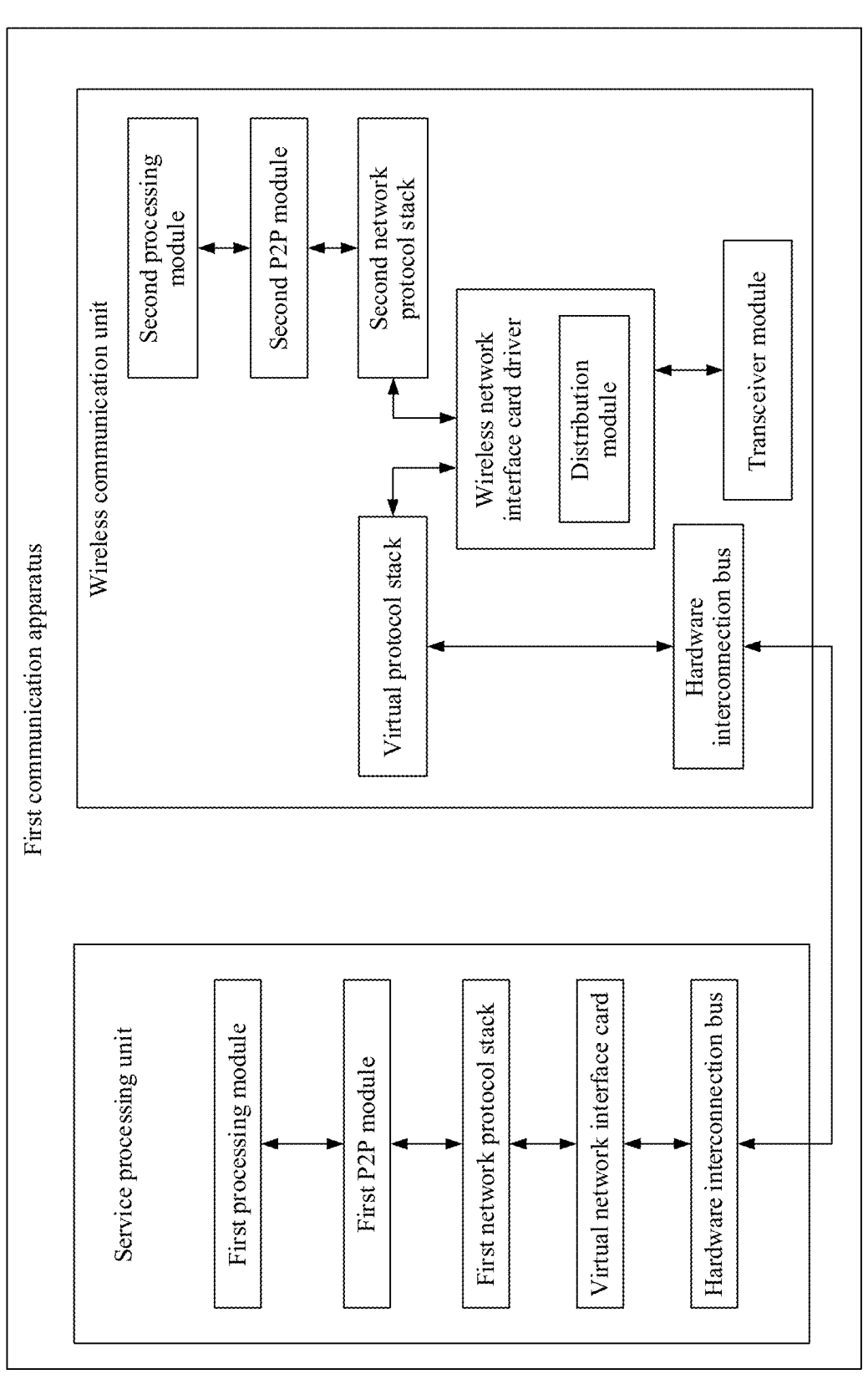
FIG. 13A is a schematic diagram of an example of a deployment architecture of a variant bridge according to an embodiment of this application.
Figure 13B:
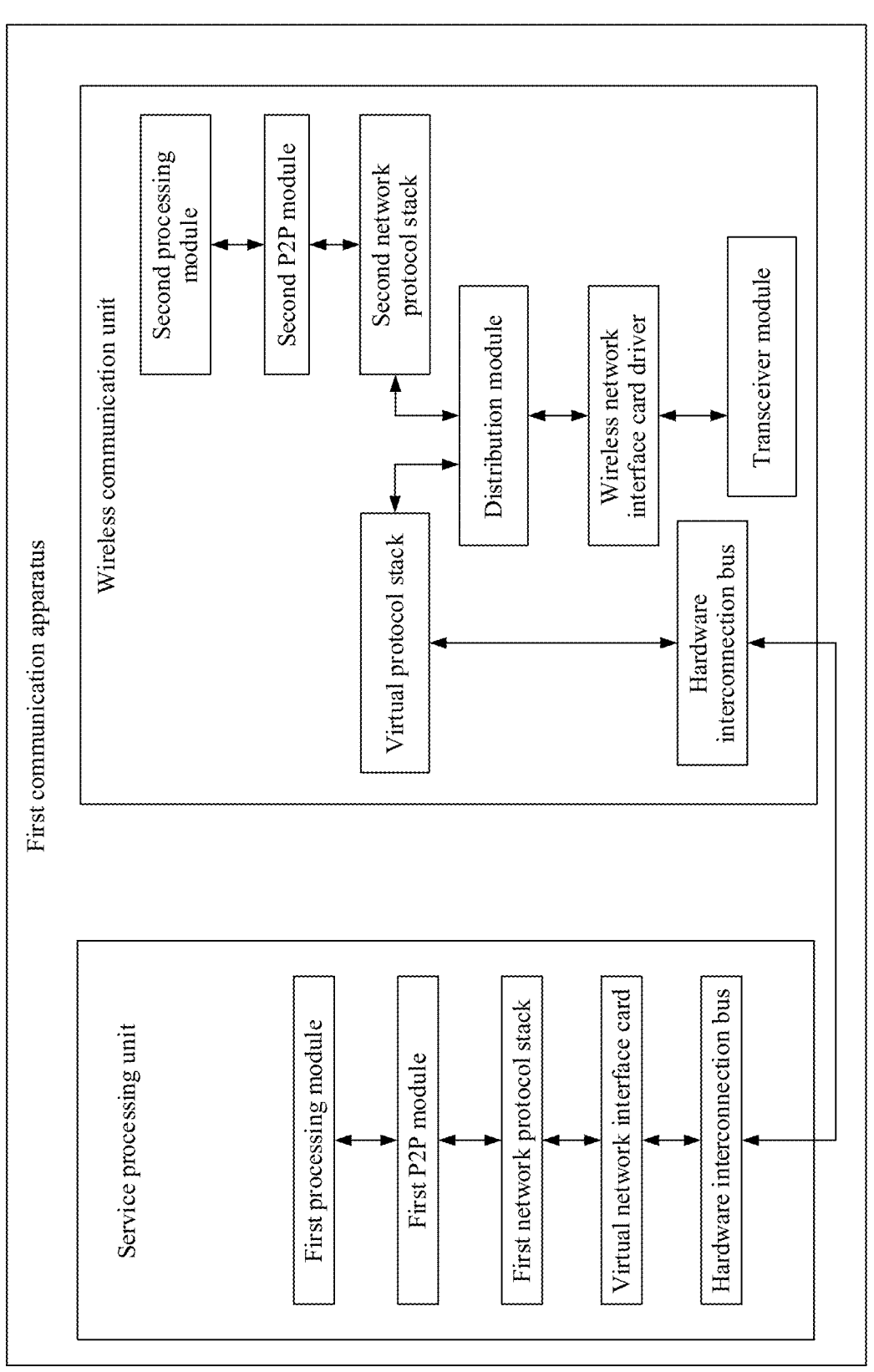
FIG. 13B is a schematic diagram of another example of a deployment architecture of a variant bridge according to an embodiment of this application.
Figure 14A:
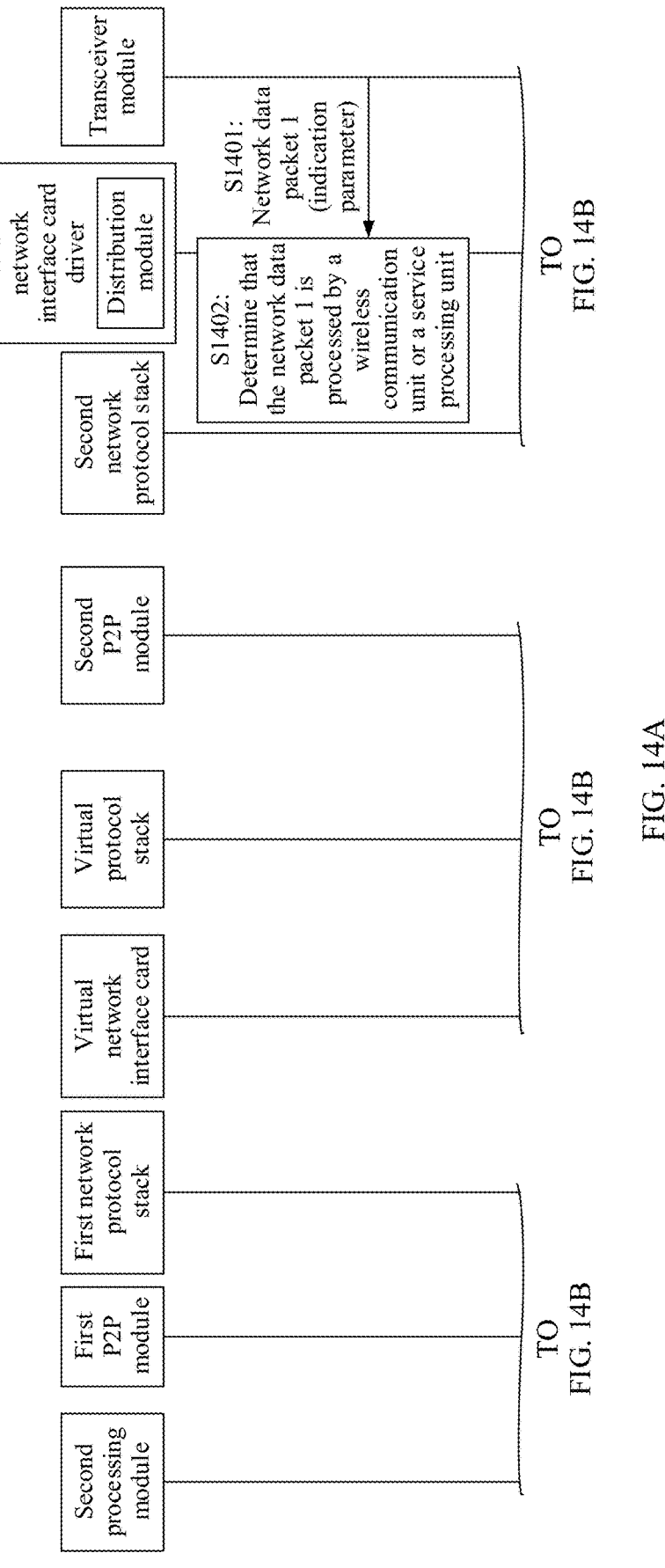
FIG. 14A to FIG. 14E are a schematic flowchart of a communication method in a variant bridge deployment scenario according to an embodiment of this application.
Figure 14B:
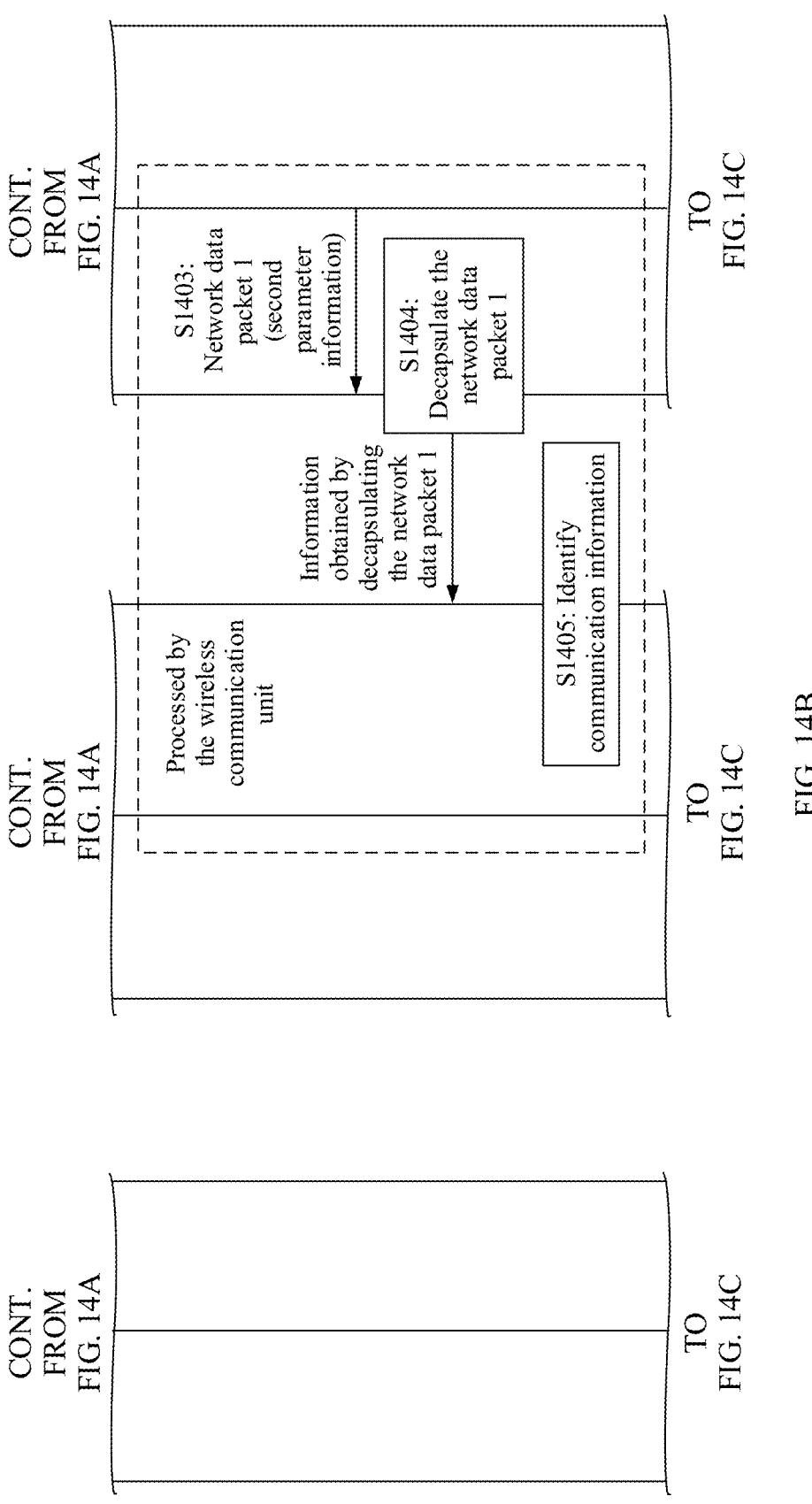
Figure 14C:
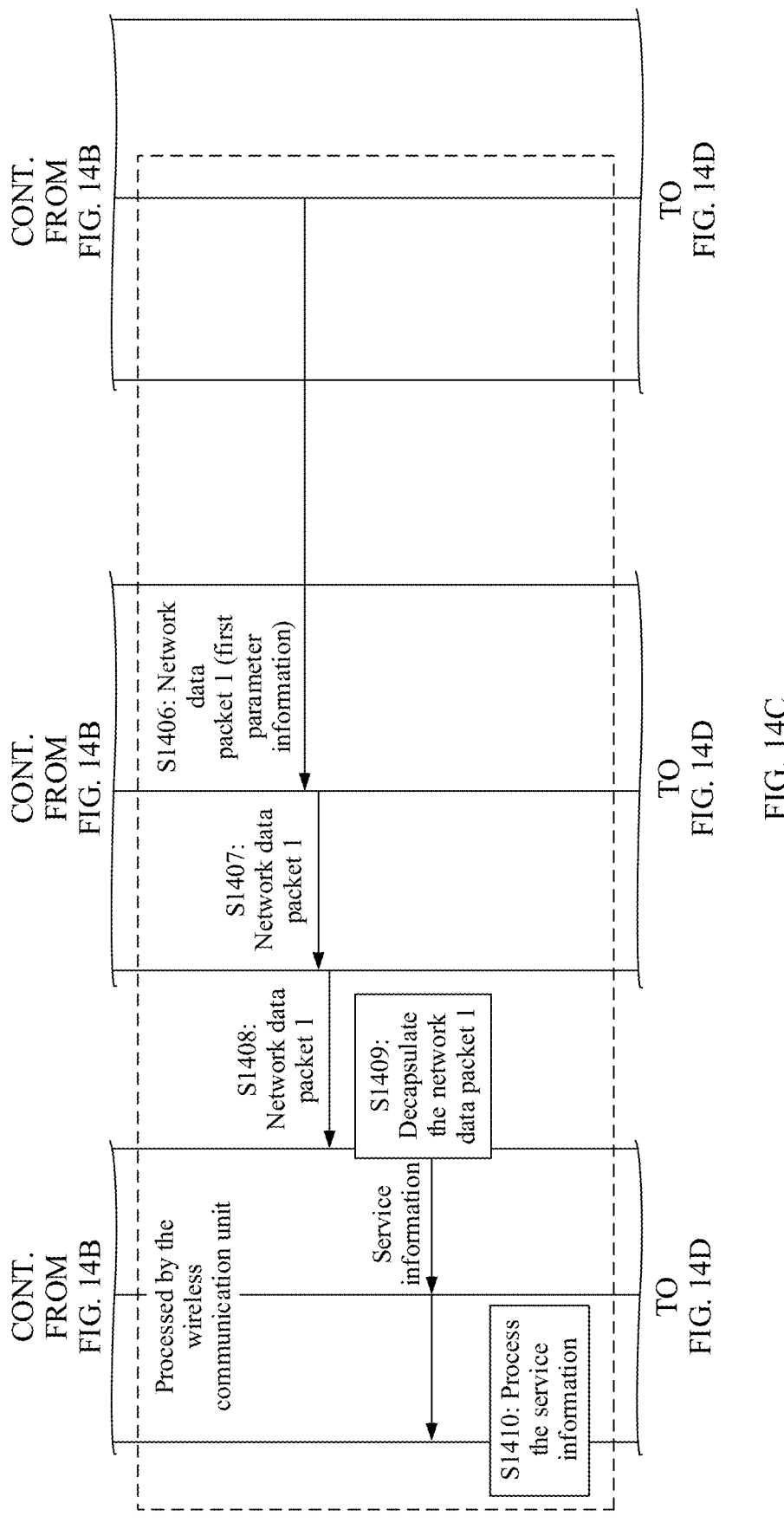
Figure 14D:
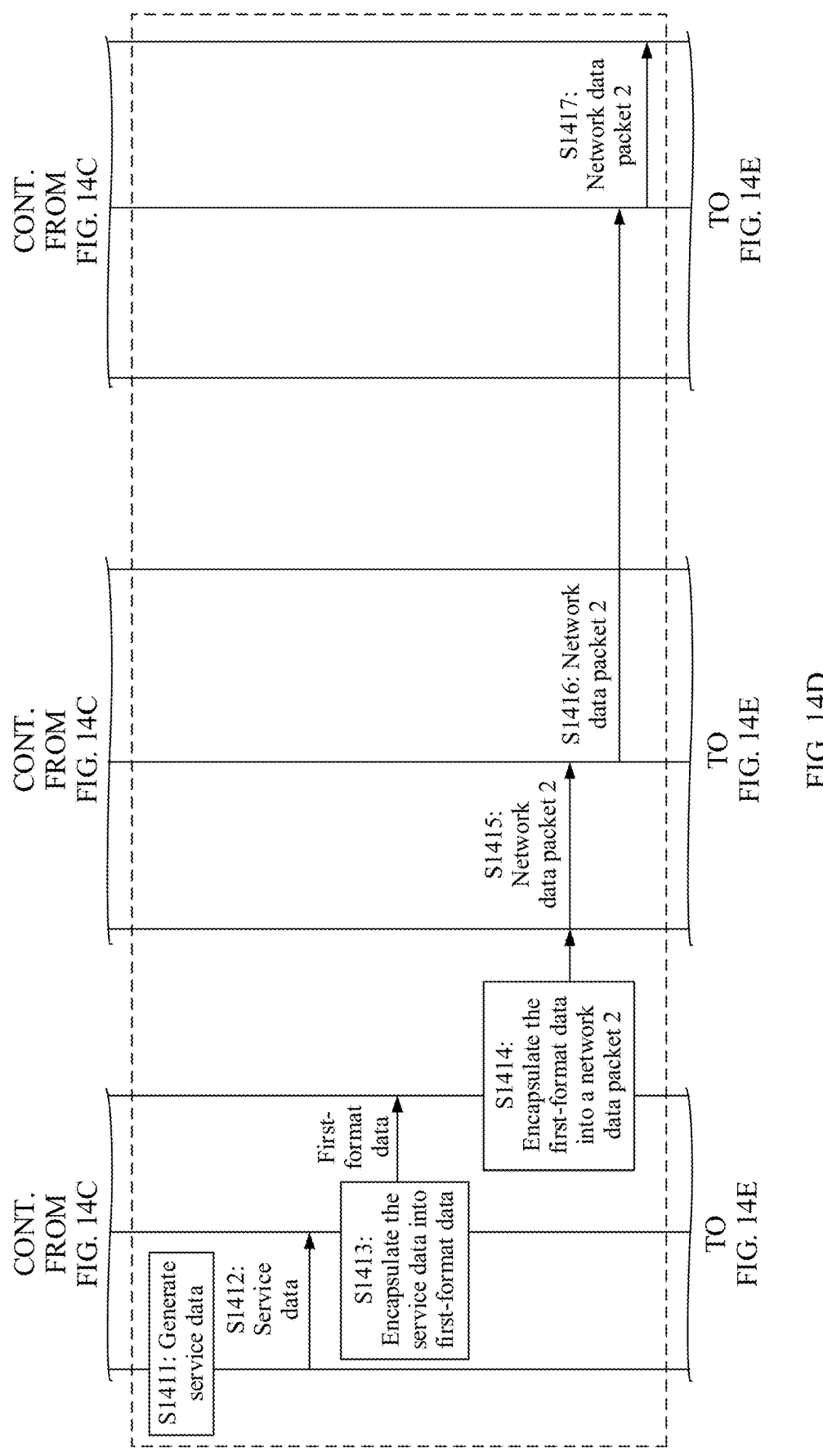
Figure 14E:
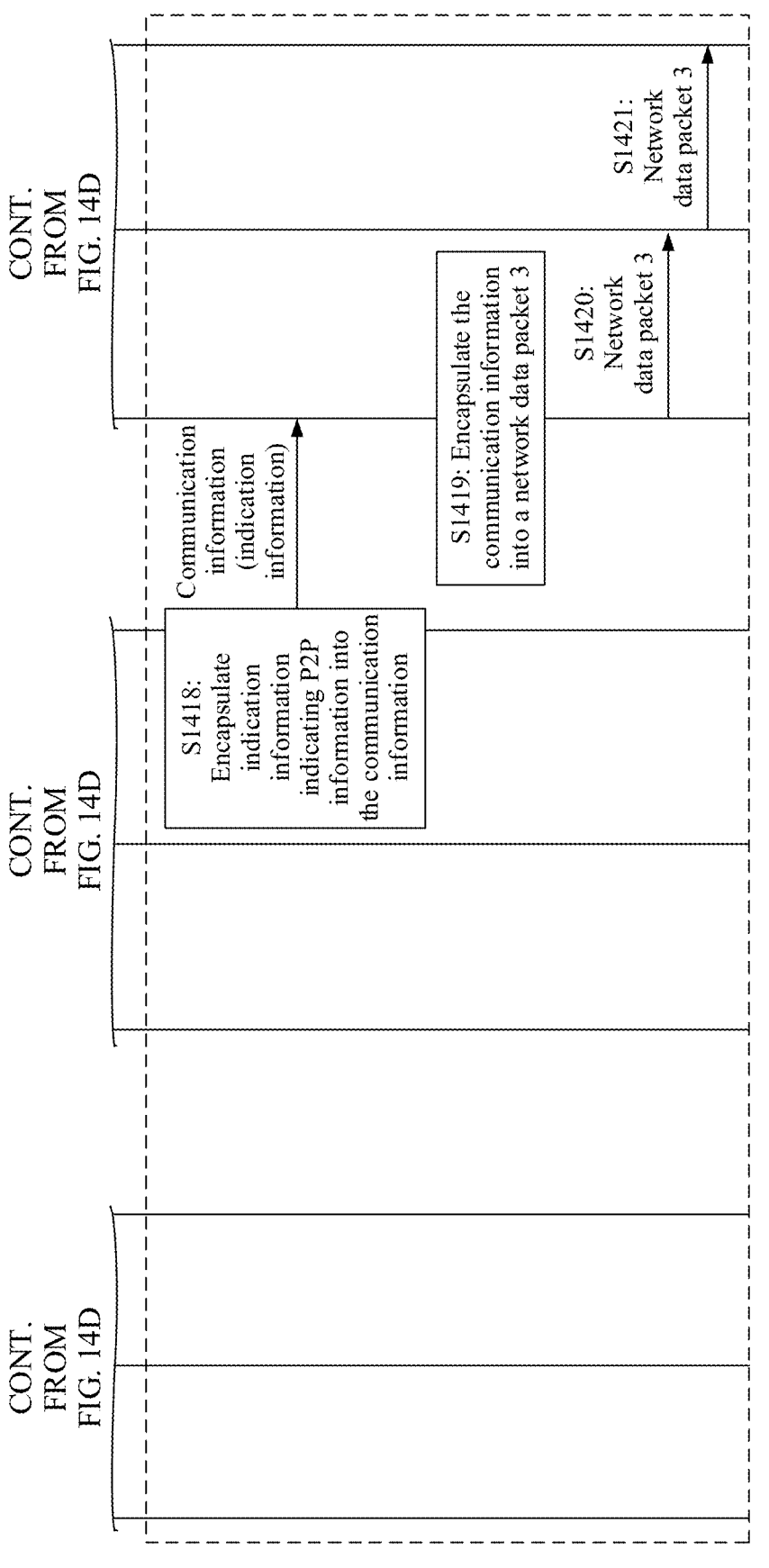

FIG. 13A and FIG. 13B are schematic diagrams of two examples of deployment architectures of variant bridges according to an embodiment of this application.

The service processing unit of the first communication apparatus includes a first P2P module and the first network protocol stack. The first P2P module is configured to encapsulate the to-be-sent service data into the first-format data. The service processing unit further includes a first processing module (camera app), and the first processing module is configured to obtain the to-be-sent service data. The service processing unit may not be configured with a physical network interface card (NIC). The network interface card may be referred to as a network adapter for short. A virtual (virtual) network interface card (NIC) may be deployed on the service processing unit and used as a network interface card of the first network protocol stack. The first processing module may be an app for implementing a service, for example, a camera app. An IP address of the virtual network interface card is the same as an IP address of a wireless network interface card driver.

The wireless communication unit of the first communication apparatus includes a second P2P module and the second network protocol stack. The second P2P module is responsible for hole punching between the second P2P module and the second communication apparatus, to establish the P2P channel. The second network protocol stack is responsible for encapsulation and decapsulation of a network data packet. The wireless communication unit may further include a second processing module and a transceiver module. The transceiver module may be a radio frequency (RF), configured to receive and send a network data packet. A distribution module is configured to perform distribution processing on the network data packet received from the second communication apparatus, and determine that the received network data packet is processed by the wireless communication unit or the service processing unit. The distribution module may be deployed together with the second network protocol stack, or the distribution module may be deployed in the second network protocol stack. The wireless communication unit further includes a wireless network interface card driver. The distribution module may alternatively be deployed on the wireless network interface card driver. Alternatively, the distribution module may be independently deployed. A deployment location of the distribution module is not specifically limited in this application. In FIG. 13A, an example in which the distribution module is deployed on the wireless network interface card driver is used. In FIG. 13B, an example in which the distribution module is independently deployed is used. The first processing module may be a wireless application (app), for example, a Wi-Fi app.

The wireless communication unit further includes a virtual protocol stack, serving as a proxy protocol stack of the first network protocol stack in the service processing unit. Therefore, the network data packet sent by the wireless communication unit and the network data packet sent by the service processing unit can have a same IP address and/or media access control (MAC) address.

The service processing unit and the wireless communication unit may be connected through a hardware interconnection bus.

When the network protocol stacks (including the first network protocol stack and the second network protocol stack) use a UDP, the UDP is a connectionless protocol. When the service processing unit takes over the P2P channel, a port used for second electronic communication may be allocated to the service processing unit. For example, a port connecting the wireless communication unit and an MCU is allocated to the service processing unit. Therefore, the network data packet from the second communication apparatus is not sent to the MCU for processing, but is forwarded to the service processing unit for processing.

When the network protocol stack uses a TCP, after the service processing unit is powered on or woken up, the first P2P module triggers a TCP handshake. The virtual network interface card may be responsible for intercepting the TCP handshake. For example, the first P2P module sends a TCP handshake request, and when receiving the TCP handshake request, the virtual network interface card sends a TCP handshake acknowledgment to the first P2P module. In this way, the service processing unit is prohibited from sending a TCP handshake message to the second communication apparatus through the P2P channel. Alternatively, the wireless communication unit may be responsible for intercepting a message related to the TCP handshake. For example, the virtual protocol stack is responsible for intercepting a TCP handshake request message, or the distribution module is responsible for intercepting the TCP handshake request message, or the wireless network interface card driver is responsible for intercepting the TCP handshake request message.

FIG. 14A to FIG. 14E are a schematic flowchart of a communication method according to an embodiment of this application. In FIG. 14A to FIG. 14E, a solution provided in this embodiment of this application is described with reference to the deployment architecture in FIG. 13A. S1401 to S1410 describe transmission and processing of a received downlink data packet. Steps S1411 to S1417 describe processing and transmission of an uplink data generated by a service processing unit. Steps S1418 to S1423 describe processing and transmission of an uplink data generated by a wireless communication unit.

S1401: A transceiver module receives a network data packet 1 from a second communication apparatus. The network data packet 1 carries an indication parameter. The transceiver module sends the first network data packet 1 to a wireless network interface card driver. The indication parameter is used for determining that the network data packet 1 is processed by the wireless communication unit or the service processing unit.

After the service processing unit enters a working mode, the indication parameter is first parameter information, and a mapping relationship on a first communication apparatus includes the first mapping relationship. When the service processing unit is in a non-working mode, the indication parameter is second parameter information, and the mapping relationship of the first communication apparatus includes the second mapping relationship.

S1402: A distribution module in the wireless network interface card driver determines, based on the indication parameter and the mapping relationship (the first mapping relationship or the second mapping relationship), that the network data packet 1 is processed by the wireless communication unit or processed by the service processing unit. When it is determined that the network data packet 1 is processed by the wireless communication unit, S1403 is performed.

For example, if an indication parameter in a packet header of the network data packet 1 is the first parameter information, the network data packet 1 is processed by the wireless communication unit. If an indication parameter in a packet header of the network data packet 1 is the second parameter information, the network data packet 1 is processed by the service processing unit.

When it is determined that the network data packet 1 is processed by the service processing unit, S1406 is performed. The distribution module forwards the network data packet 1 to a virtual protocol stack.

S1403: The distribution module forwards the network data packet 1 to a second network protocol stack.

S1404: The second network protocol stack decapsulates the network data packet 1, and sends communication information obtained through decapsulation to a second P2P module. The communication information is, for example, P2P information of the second communication apparatus.

S1405: A second P2P module identifies that the communication information is the P2P information, and saves the P2P information.

S1406: The distribution module forwards the network data packet 1 to the virtual protocol stack.

S1407: The virtual protocol stack sends the network data packet 1 to the virtual network interface card through a hardware interconnection bus.

S1408: The virtual network interface card sends the network data packet 1 to a first network protocol stack.

S1409: The first network protocol stack decapsulates the network data packet 1, and sends service information obtained through decapsulation to a first processing module via the first P2P module.

S1410: The first processing module processes information obtained by decapsulating the network data packet 1.

S1411: The first processing module generates service data. For example, a camera app generates a media stream. The medium stream may be an audio stream, a video stream, or an audio/video stream.

S1412: The first processing module sends the service data to the first P2P module.

S1413: The first P2P module encapsulates the service data into first-format data, and sends the first-format data to the first network protocol stack.

S1414: The first network protocol stack encapsulates the first-format data into a network data packet 2.

S1415: The first network protocol stack sends the network data packet 2 to the wireless communication unit via the virtual network interface card.

S1416: The virtual protocol stack receives the network data packet 2 from the wireless communication unit, and sends the network data packet 2 to the wireless network interface card driver.

S1417: The wireless network interface card driver sends the network data packet 2 to the transceiver module, so that the transceiver module sends the network data packet 2.

S1418: The second P2P module encapsulates indication information indicating the P2P information into to-be-sent communication information, and sends the to-be-sent communication information to the second network protocol stack.

S1419: The second network protocol stack encapsulates the communication information including the indication information into a network data packet 3.

S1420: The second network protocol stack sends the network data packet 3 to the wireless network interface card driver.

S1421: The wireless network interface card driver sends the network data packet 3 to the transceiver module, so that the transceiver module sends the network data packet 3.

In addition, a resource in the wireless communication unit is limited. For example, an available memory is small, and a CPU processing capability is weak. When network transmission quality deteriorates, a network data packet that is sent by the service processing unit and that carries the service data may not be processed in time, and the available memory of the wireless communication unit is may be insufficient. Therefore, the data packet sent by the service processing unit may not be sent in time, resulting in packet loss and service interruption.

In view of this, this application provides a backpressure mechanism. When remaining memory space of the wireless communication unit is insufficient, the memory on the service processing unit side may be used for buffering the network packet.

When determining that the remaining memory space is less than a first threshold, the wireless communication unit sends a first notification to the service processing unit, where the first notification indicates to the service processing unit to suspend sending of the network data packet. If currently there is a to-be-sent network data packet on the service processing unit, or in other words, before sending the network data packet to the wireless communication unit, the service processing unit receives the first notification from the wireless communication unit, and suspends sending of the network data packet.

After the suspension, an occasion to resume sending the network data packet may be determined in any one of the following manners:

In a first possible manner, the wireless communication unit actively indicates, based on the remaining memory space, the service processing unit to continue sending the network data packet.

Specifically, after sending the first notification to the service processing unit, the wireless communication unit determines that the remaining memory space is greater than a second threshold, and sends a second notification to the service processing unit. The second notification indicates to the service processing unit to continue sending the network data packet, and the second threshold is greater than the first threshold. Therefore, after receiving the second notification, the service processing unit sends the network data packet to the wireless communication unit.

In a second possible manner, the service processing unit actively attempts to perform sending to the wireless communication unit.

Specifically, after a duration for receiving the first notification reaches preset duration, the service processing unit sends the network data packet to the wireless communication unit. After receiving the network data packet, the wireless communication unit determines that the remaining memory space is greater than the second threshold, and may continue processing the network data packet. After receiving the network data packet, if the wireless communication unit determines that the remaining memory space is less than the first threshold, the wireless communication unit may send the first notification to the service processing unit.

In this embodiment of this application, the backpressure mechanism is provided. When the memory of the wireless communication unit is insufficient, the service processing unit is notified to suspend sending. When the memory of the wireless communication unit is sufficient, for example, when sending of the network data packet on the wireless communication unit is finished, or a peer side receives a retransmitted packet, the data packet on the service processing unit arrives at the wireless communication unit. This can resolve packet loss caused by network jitter in a wireless network, and improve network sending efficiency and user experience.

Second, a solution in which the service processing unit and the wireless communication unit use different IP addresses is described.

A difference between this solution and the foregoing solution in which the service processing unit and the wireless communication unit use a same IP address lies in that:

After sending a first network data packet to the wireless communication unit, the service processing unit needs to translate address information of the service processing unit into address information of the wireless communication unit for a source address of the first network data packet, and then send the first network data packet to the second communication apparatus through a P2P channel based on channel information of the P2P channel.

With reference to a deployment architecture of NAT translation, the following describes in detail a solution in which the service processing unit and the wireless communication unit use different IP addresses.

Figure 15A:
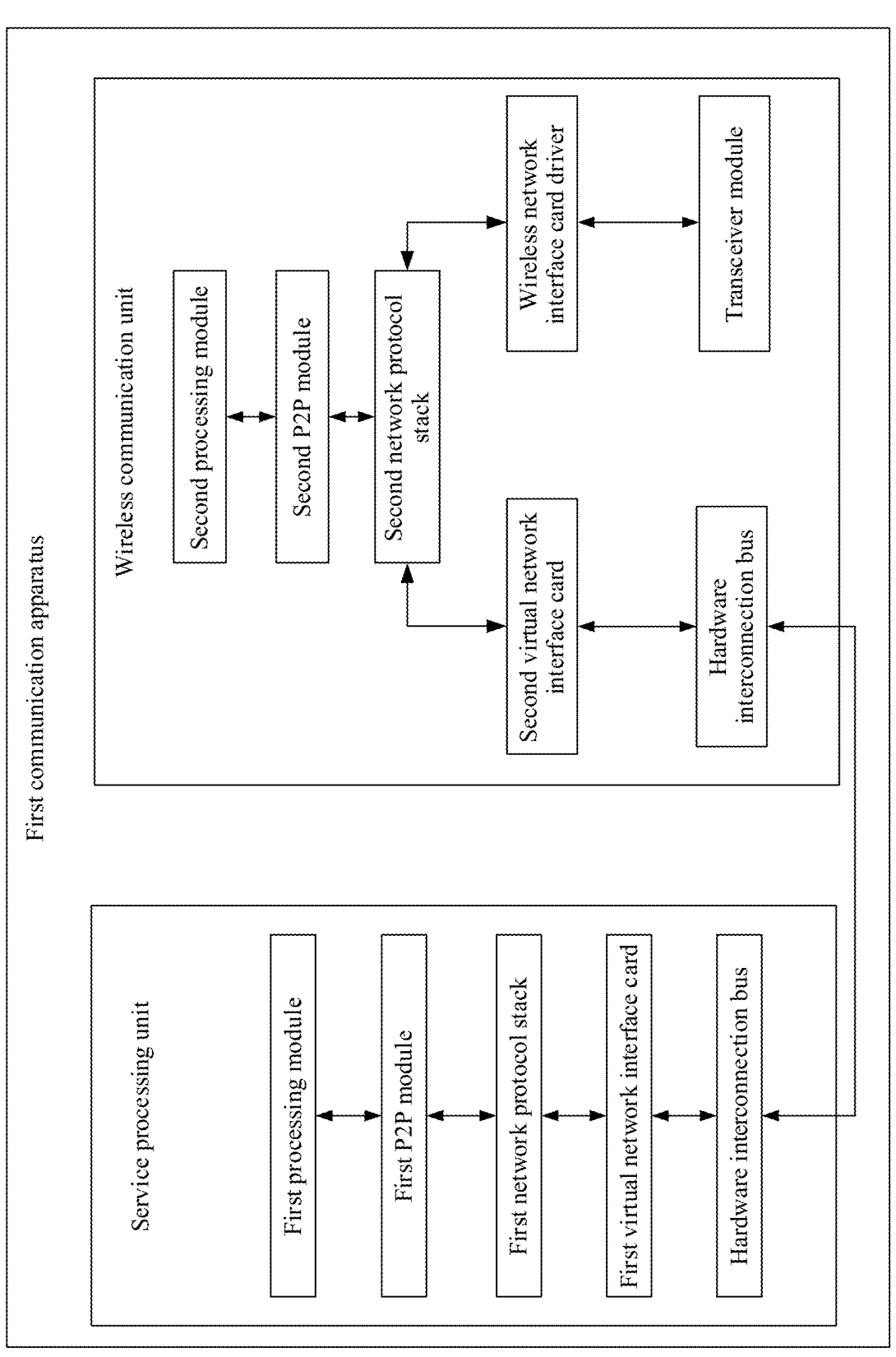
FIG. 15A is a schematic diagram of an example of a NAT deployment architecture according to an embodiment of this application.
Figure 15B:
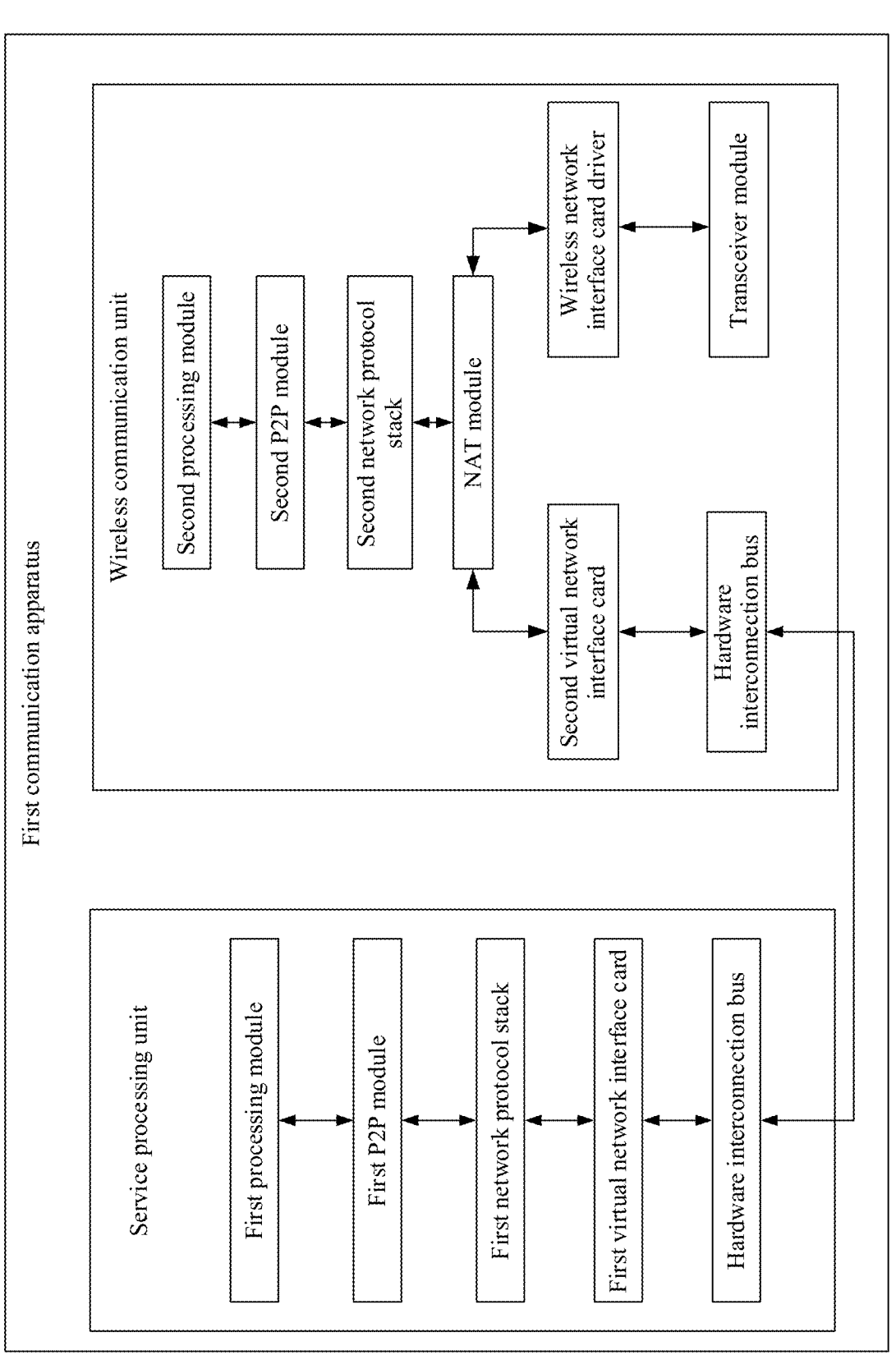
FIG. 15B is a schematic diagram of another example of a NAT deployment architecture according to an embodiment of this application.
Figure 16A:
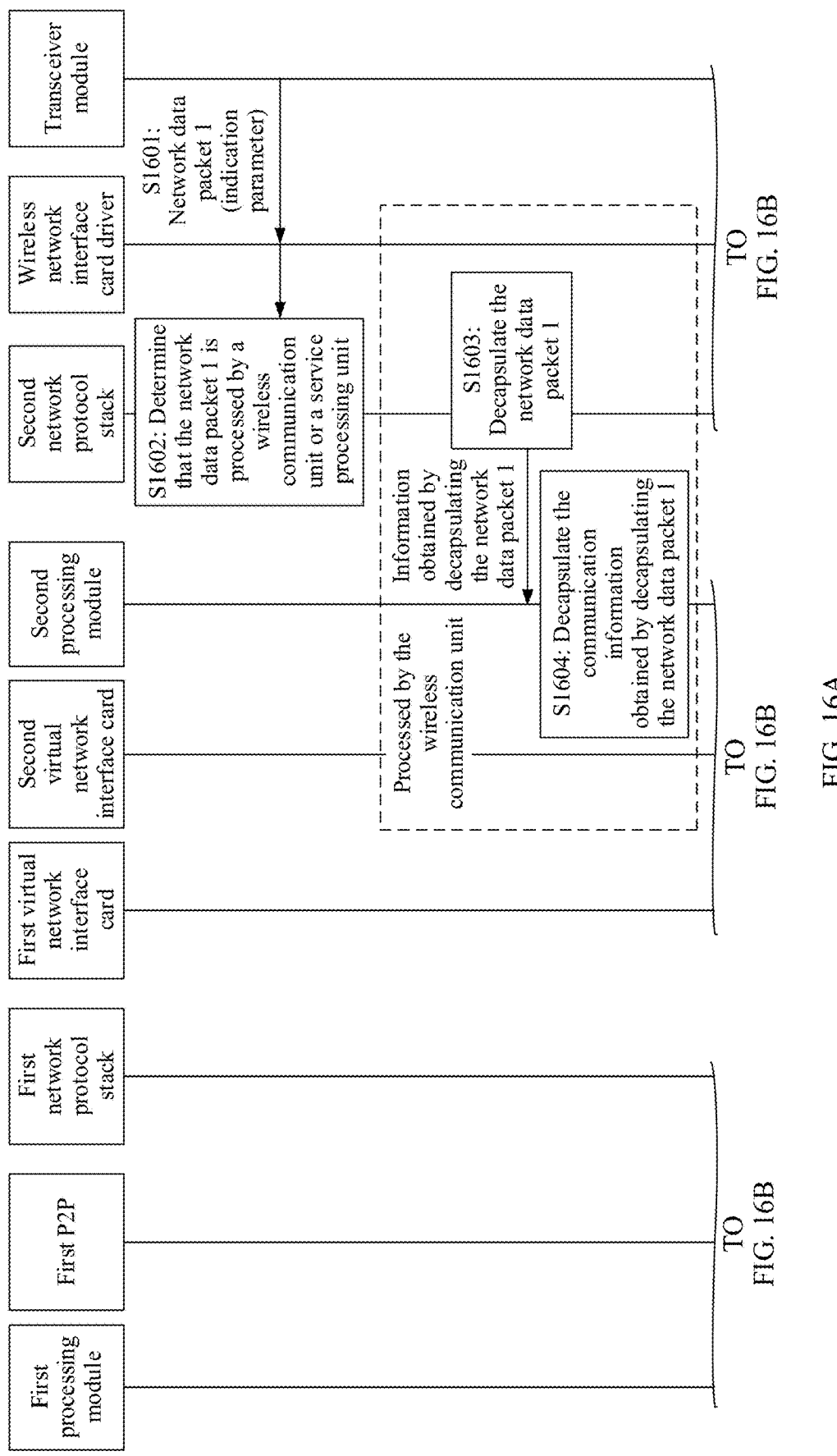
FIG. 16A to FIG. 16D are a schematic flowchart of a communication method in a NAT deployment scenario according to an embodiment of this application.
Figure 16B:
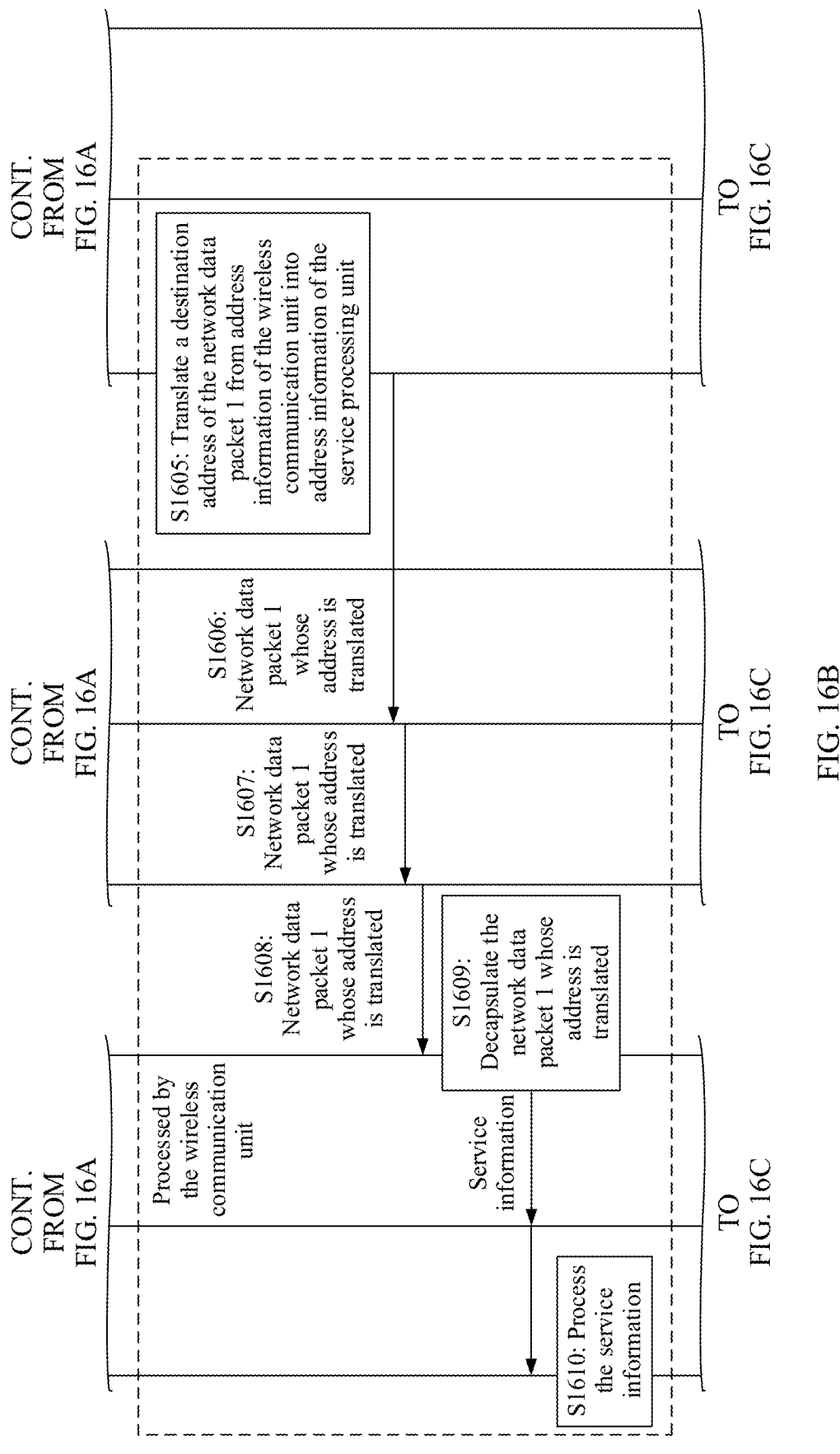
Figure 16C:
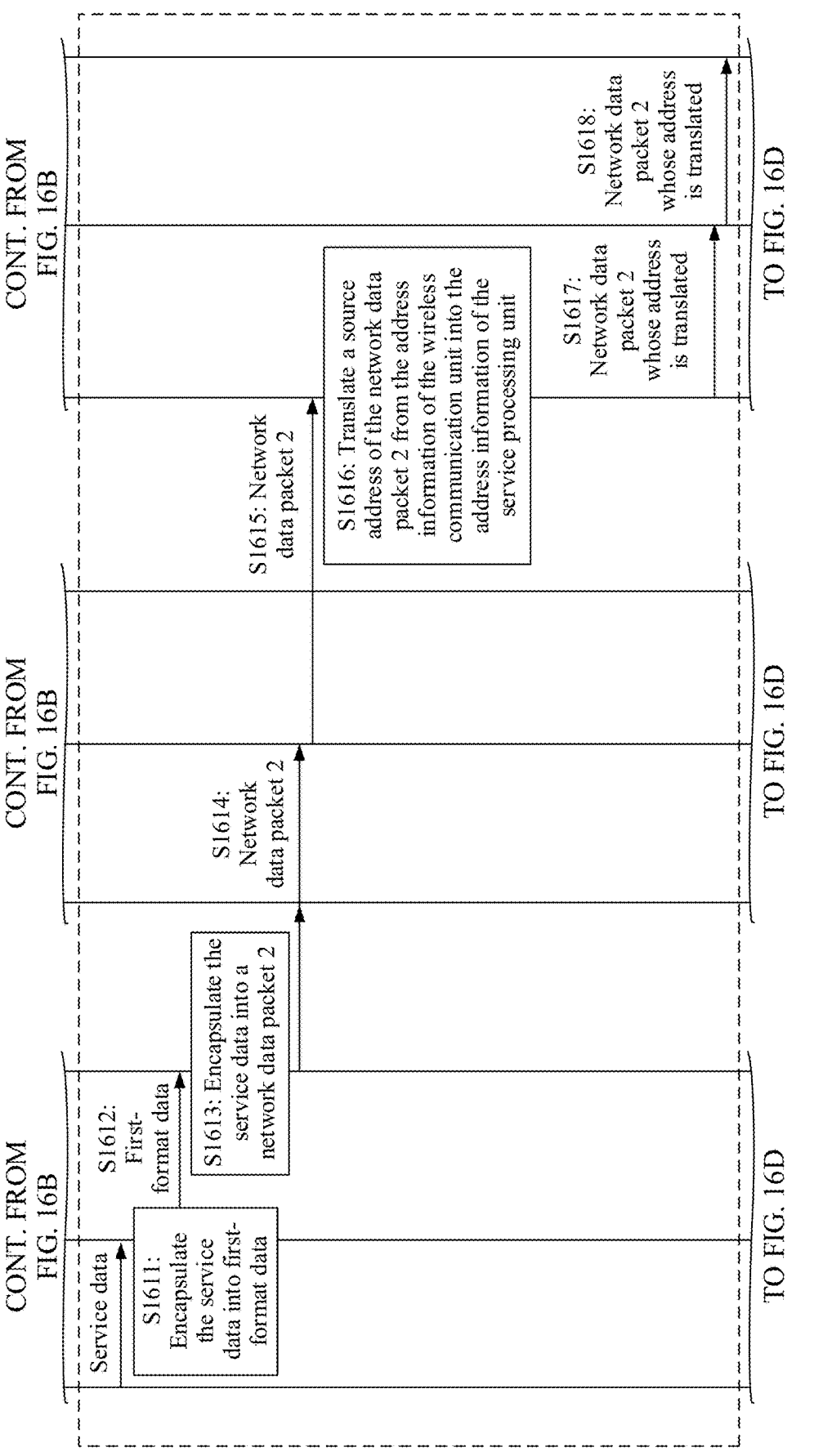
Figure 16D:
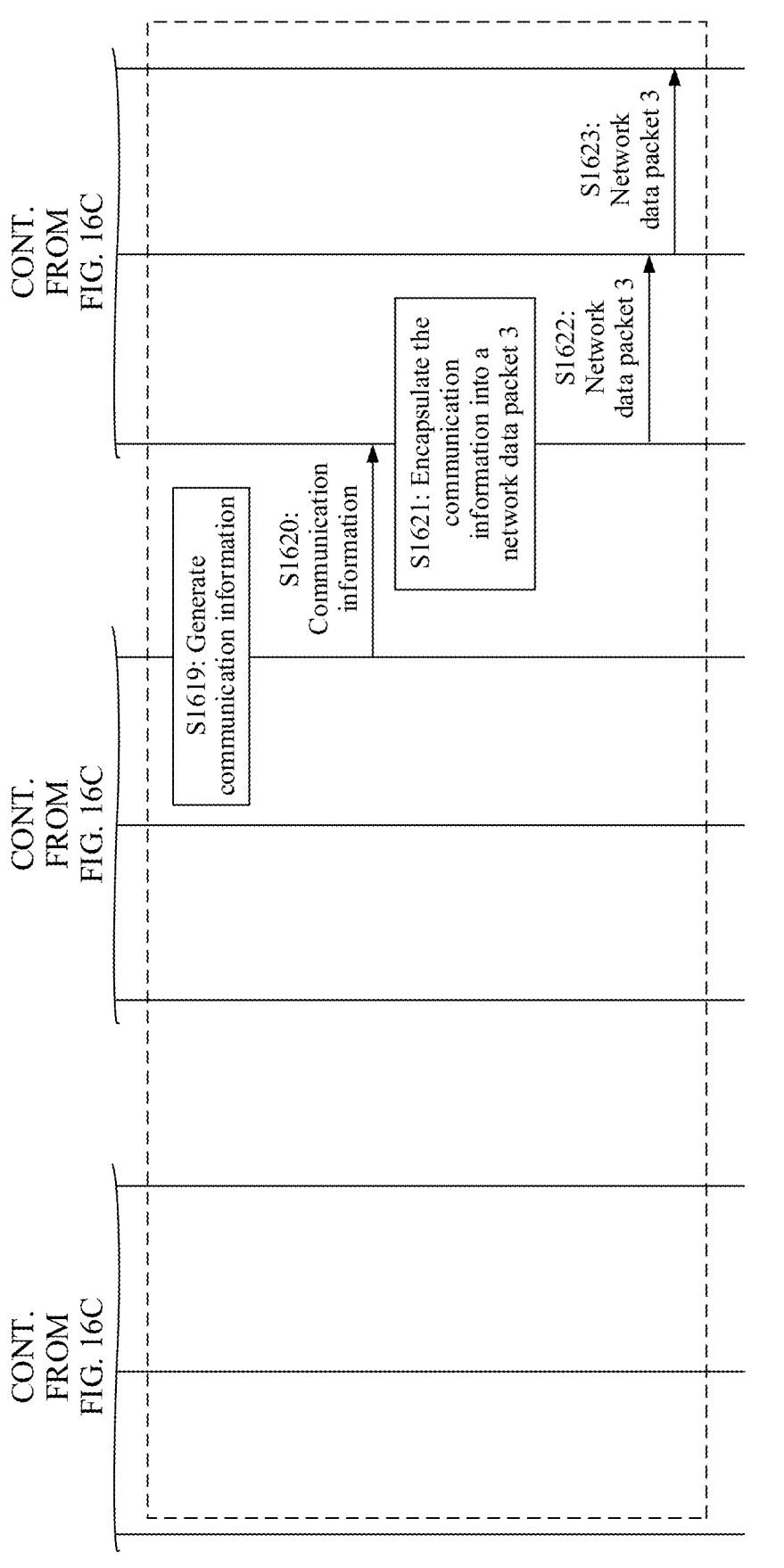

FIG. 15A and FIG. 15B are schematic diagrams of two examples of NAT deployment architectures according to an embodiment of this application. A wireless communication unit of a first communication apparatus includes a transceiver module, a second network protocol stack, and a second P2P module. The apparatus may further include a second processing module. The transceiver module may be a radio frequency (RF), configured to receive and send a network data packet. The second network protocol stack is used for encapsulating a data packet. The second network protocol stack further has a distribution function, and is configured to perform distribution processing on a network data packet received from a second communication apparatus, and determine that the received network data packet is processed by the wireless communication unit or a service processing unit. In an example, refer to FIG. 15A. A first network protocol stack further has a NAT translation function. In another example, a NAT translation function may alternatively be deployed outside a first network protocol stack, and is performed by an independent module. For example, refer to FIG. 15B. A NAT module is deployed in the wireless communication unit, and may perform IP packet header processing on a network data packet sent by the service processing unit, change a source IP address and/or a source port number, and then resend the network data packet to the second communication apparatus. In addition, for the network data packet sent from the external second communication apparatus, the wireless communication unit may determine, based on an indication parameter in the network data packet and a mapping relationship, that the network data packet is sent to the service processing unit or the wireless communication unit itself. If the network data packet is sent to the service processing unit, a correspondence is found from an address translation table, and a destination IP address and a destination port number are replaced before the network data packet is sent to the service processing unit.

A service processing unit of an electronic device includes a first network protocol stack, a first P2P module, and a first processing module (camera app). The service processing unit may not be provided with a physical network interface card. A virtual network interface card may be deployed on the service processing unit as a network interface card of a second network protocol stack. For ease of distinguishing, the virtual network interface card deployed on the service processing unit is referred to as a first virtual network interface card. A second processing module may be an app for implementing a service, for example, a camera app. An IP address of the first virtual network interface card is different from an IP address of a wireless network interface card driver.

A virtual network interface card is also deployed on a wireless communication unit. For ease of distinguishing, the virtual network interface card deployed on the wireless communication unit is referred to as a second virtual network interface card. The second virtual network interface card serves as a proxy network interface card of the first virtual network interface card. Registration information of the second virtual network interface card is sent to the first network protocol stack. The registration information of the second virtual network interface card may include an IP address and/or a port number of the second virtual network interface card.

The service processing unit and the wireless communication unit may be connected through a hardware interconnection bus.

In an example, the IP address of the first virtual network interface card may be 192.168.1.2, and is used as an IP address of the service processing unit. The IP address of the second virtual network interface card may be 192.168.1.1, and is used as an internal IP address of the wireless communication unit. The internal IP address of the wireless communication unit may be used for communication between the service processing unit and the wireless communication unit. It should be noted that the communication between the service processing unit and the wireless communication unit described herein does not include a case in which communication between the service processing unit and a business service device passes through the wireless communication unit. The IP address of the wireless network interface card driver may be 192.168.0.2, and is used as an external network IP address of the wireless communication unit.

For example, the IP address of the first virtual network interface card may be the same as the IP address of the second virtual network interface card.

FIG. 16A to FIG. 16D are a schematic flowchart of a communication method according to an embodiment of this application. In FIG. 16A to FIG. 16D, a solution provided in this embodiment of this application is described with reference to the deployment architecture in FIG. 15A. S1601 to S1610 describe receiving and processing of a downlink data packet. Steps S1611 to S1618 describe processing and transmission of uplink data generated by a service processing unit. Steps S1619 to S1623 describe processing and transmission of uplink data generated by a wireless communication unit.

For S1601, refer to S1401. Details are not described herein again.

S1602: A second network protocol stack determines, based on the indication parameter and the mapping relationship (the first mapping relationship or the second mapping relationship), that the network data packet 1 is processed by the wireless communication unit or processed by the service processing unit. When it is determined that the network data packet 1 is processed by the wireless communication unit, S1603 is performed.

For example, if an indication parameter in a packet header of the network data packet 1 is the first parameter information, the network data packet 1 is processed by the wireless communication unit. If an indication parameter in a packet header of the network data packet 1 is the second parameter information, the network data packet 1 is processed by the service processing unit.

When it is determined that the network data packet 1 is processed by the service processing unit, S1605 is performed.

S1603: The second network protocol stack decapsulates the network data packet 1, and sends information obtained through decapsulation to a second P2P module.

S1604: A second P2P module identifies that communication information is P2P information, and saves the P2P information.

S1605: The second network protocol stack translates a destination address of the network data packet 1 from address information of the wireless communication unit into address information of the service processing unit. The address information includes an IP address and/or a port number.

Before the address translation, the destination address of the network data packet 1 is the address information of the wireless communication unit. After the address translation, the destination address of the network data packet 1 is the address information of the service processing unit.

For example, the address information includes an IP address. A destination IP address of the network data packet 1 is 192.168.0.2, and a translated destination IP address of the network data packet is 192.168.1.2. An address translation table is stored in an electronic device, and there is a mapping relationship between 192.168.0.2 and 192.168.1.2 in the address translation table.

For example, the address information includes an IP address and a port number. A destination IP address of the network data packet 1 is 192.168.0.2, and a port number is 888. A translated destination IP address of the network data packet is 192.168.1.2, and a translated port number is 666.

S1606: The second network protocol stack forwards the network data packet 1 whose address is translated to a second virtual network interface card.

S1607: The second virtual network interface card sends the network data packet 1 to a first virtual network interface card through a hardware interconnection bus.

S1608: The first virtual network interface card sends the network data packet 1 to a first network protocol stack.

S1609: The first network protocol stack decapsulates the network data packet 1, and sends service information obtained through decapsulation to a first processing module via a first P2P module.

The first network protocol stack determines, based on the destination address of the network data packet 1 whose address is translated, that the network data packet 1 is a data packet sent to the service processing unit for processing, to send the network data packet 1 to the first processing module for processing.

S1610: The first processing module processes service information.

S1611: The first P2P module encapsulates service data generated by the first processing module into first-format data.

The service data generated by the first processing module is, for example, a media stream generated by a camera app. The medium stream may be an audio stream, a video stream, or an audio/video stream.

S1612: The first P2P module sends the first-format data to the first network protocol stack.

S1613: The first network protocol stack encapsulates the service data into a network data packet 2.

S1614: The first network protocol stack sends the network data packet 2 to the wireless communication unit via the first virtual network interface card.

S1615: The first virtual network interface card receives the network data packet 2 from the wireless communication unit, and sends the network data packet 2 to the second network protocol stack.

S1616: The second network protocol stack translates a source address of the network data packet 2 from the address information of the wireless communication unit into the address information of the service processing unit.

S1617: The second network protocol stack sends the network data packet 2 whose address is translated to the wireless network interface card driver.

S1618: The wireless network interface card driver sends the network data packet 2 whose address is translated to the transceiver module, so that the transceiver module sends the network data packet 2 whose address is translated.

S1619: The second processing module generates communication information, for example, a heartbeat packet.

S1620. The second processing module sends the communication information to the first network protocol stack via the second P2P module.

S1621: The second network protocol stack encapsulates the communication information into a network data packet 3.

S1622: The second network protocol stack sends the network data packet 3 to the wireless network interface card driver.

S1623: The wireless network interface card driver sends the network data packet 3 to the transceiver module, so that the transceiver module sends the network data packet 3.

In addition, if the wireless communication unit sets both external address information and internal address information, the wireless communication unit may send a data packet to the service processing unit. For example, the wireless communication unit generates a data packet 1. A source IP address of the data packet 1 is an internal IP address of the wireless communication unit, for example, 192.168.1.1, and a destination IP address of the data packet 1 is an IP address of the service processing unit, for example, 192.168.1.2. The service processing unit receives the data packet 1, and may determine that the data packet 1 is the data packet 1 sent by the wireless communication unit, to decapsulate and process the data packet 1. Similarly, the service processing unit may also send a data packet, for example, a data packet 2, to the wireless network communication unit. A source IP address of the data packet 2 is the IP address of the service processing unit, and a destination IP address of the data packet 2 is the internal IP address of the wireless communication unit. The wireless communication unit receives the data packet 2, and the second network protocol stack determines, based on the destination IP address, that the data packet 2 is the data packet sent to the wireless communication unit for processing, to forward the data packet 2 to the second processing module for processing.

In the foregoing NAT solution of this embodiment of this application, a network protocol stack is disposed on each of the service processing unit and the wireless communication unit, and the wireless communication unit is responsible for distribution. This can ensure processing of a network service and improve a throughput of a wireless network when a processing capability of the wireless communication unit is weak. The network protocol stack is deployed on the wireless communication unit. If the service processing unit is powered off, the wireless communication unit can still communicate with an external device, for example, perform network keepalive and remote wakeup. In addition, the wireless communication unit may independently develop a network application. This also facilitates service deployment of the low-power wireless communication unit. The network protocol stack is deployed on the service processing unit. After being powered on, the service processing unit may independently exchange a network data packet with the external device, for example, perform transmission of an audio/video stream. The service processing unit can independently develop a network application. This also facilitates service deployment of the service processing unit.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the other programmable device, so that computer-implemented processing is generated. Therefore, the instructions executed on the computer or the other programmable device provide steps for implementing a specific function in one or more procedures in the flowcharts and/or in one or more blocks in the block diagrams.

It is clearly that a person skilled in the art can make various modifications and variations to embodiments of this application without departing from the scope of embodiments of this application. This application is intended to cover these modifications and variations in embodiments of this application provided that they fall within the scope of protection defined by the following claims of this application and their equivalent technologies.

What is claimed is:

1. A communication method, applied to a first communication apparatus powered by a battery, wherein the first communication apparatus comprises a service processing chip and a wireless communication chip, and the method comprises:

before the service processing chip enters a working mode, establishing, by the wireless communication chip, a transmission channel with a second communication apparatus;

sending, by the service processing chip, an occupation notification to the wireless communication chip, wherein the occupation notification indicates that the service processing chip is to occupy the transmission channel;

after receiving the occupation notification, suspending, by the wireless communication chip, use of the transmission channel to send network data; and then sending, by the service processing chip, a to-be-sent first network data packet to the second communication apparatus through the transmission channel after the service processing chip enters the working mode.

2. The method according to claim 1, wherein the second communication apparatus is a terminal device, and the transmission channel is a peer-to-peer P2P channel; and establishing, by the wireless communication chip, the transmission channel with the second communication apparatus comprises:

establishing, by the wireless communication chip, the P2P channel with the second communication apparatus through P2P hole punching.

3. The method according to claim 1, wherein suspending, by the wireless communication chip, use of the transmission channel comprises:

allocating, by the wireless communication chip, a port used for communicating with the second communication apparatus through the transmission channel to the service processing chip.

4. The method according to claim 1, wherein after the service processing chip enters the working mode, the method further comprises:

modifying, by the wireless communication chip, a first mapping relationship in a stored mapping relationship to a second mapping relationship; or adding, by the wireless communication chip, a first mapping relationship to a stored mapping relationship, wherein the second mapping relationship is an association relationship between first parameter information and an identifier of the service processing chip, the second mapping relationship is used for determining that a communication data packet carrying the first parameter information is processed by the service processing chip, the first mapping relationship is an association relationship between second parameter information and an identifier of the wireless communication chip, and the first mapping relationship is used for determining that a network data packet carrying the second parameter information is processed by the wireless communication chip.

5. The method according to claim 4, wherein after the service processing chip enters the working mode, the method further comprises:

receiving, by the wireless communication chip, a second network data packet sent by the second communication apparatus through the transmission channel, wherein the second network data packet carries the first parameter information;

determining, by the wireless communication chip based on the first parameter information and the second mapping relationship, that the second network data packet is processed by the service processing chip, and sending the second network data packet to the service processing chip; and decapsulating, by the service processing chip, the second network data packet by using the first network protocol stack.

6. The method according to claim 5, wherein sending, by the wireless communication chip, the second network data packet to the service processing chip comprises:

translating, by the wireless communication chip, a destination address of the second network data packet from address information of the wireless communication chip into address information of the service processing chip, and sending, based on a translated destination address, the second network data packet having the translated destination address to the service processing chip.

7. The method according to claim 4, wherein the first parameter information comprises one or more of a port number used by the service processing chip to communicate with the second communication apparatus, the IP address of the second communication apparatus, or the port number of the second communication apparatus; and the second parameter information comprises one or more of a port number used by the wireless communication chip to communicate with the second communication apparatus, the IP address of the second communication apparatus, or the port number of the second communication apparatus.

8. The method according to claim 1, wherein after sending, by the service processing chip, the occupation notification to the wireless communication chip, the method further comprises:

sending, by the service processing chip, an occupation release notification to the wireless communication chip, wherein the occupation release notification is used for notifying the wireless communication chip that the service processing chip has stopped using the transmission channel; and after the wireless communication chip receives the occupation release notification, resume using the transmission channel to send the network data packet generated by the wireless communication chip to the second communication apparatus.

9. The method according to claim 1, wherein sending, by the service processing chip, the to-be-sent first network data packet to the second communication apparatus comprises:

encapsulating, by the service processing chip, to-be-sent service data into first-format data that comprises data type information that indicates a data type of the to-be-sent service data;

encapsulating, by the service processing chip, the first-format data into the first network data packet based on channel information of the transmission channel by using a first network protocol stack, and sending the first network data packet to the wireless communication chip; and sending, by the wireless communication chip, the first network data packet to the second communication apparatus.

10. The method according to claim 9, wherein the channel information of the transmission channel comprises one or more of an IP address of the service processing chip, a port number used by the first communication apparatus to communicate with the second communication apparatus, a protocol type, an IP address of the second communication apparatus, or a port number of the second communication apparatus.

11. The method according to claim 10, wherein the IP address of the service processing chip is the same as the IP address of the wireless communication chip.

12. The method according to claim 9, wherein sending, by the wireless communication chip, the first network data packet to the second communication apparatus comprises:

translating a source address of the first network data packet from address information of the service processing chip into address information of the wireless communication chip, and sending, by the wireless communication chip, the first network data packet having a translated address to the second communication apparatus.

13. The method according to claim 1, wherein before the service processing chip enters the working mode, the method further comprises:

receiving, by the wireless communication chip, a second network data packet sent by the second communication apparatus through the transmission channel, wherein the second network data packet carries second parameter information;

determining, based on the second parameter information and the first mapping relationship, that the second network data packet has been processed by the wireless communication chip and decapsulating, by the wireless communication chip, the second network data packet by using a second network protocol stack.

14. The method according to claim 1, further comprising:

encapsulating, by the wireless communication chip, to-be-sent first communication information into a second network data packet based on the channel information of the transmission channel by using a second network protocol stack, and sending the second network data packet to the second communication apparatus, wherein the first communication information is used for communicating with the second communication apparatus.

15. A battery-powered communication apparatus having a working mode and a standby mode, the communication apparatus comprising:

a service processing chip and a wireless communication chip, wherein the wireless communication chip is configured to, before the service processing chip enters the working mode, establish a transmission channel with a second communication apparatus;

wherein the service processing chip is configured to send an occupation notification to the wireless communication chip, wherein the occupation notification indicates that the service processing chip is to occupy the transmission channel;

wherein the wireless communication chip is further configured to, after receiving the occupation notification, suspend use of the transmission channel to send network data; and wherein the service processing chip is further configured to, after entering the working mode and after sending the occupation notification, send a to-be-sent first network data packet to the second communication apparatus through the transmission channel.

16. The battery-powered communication apparatus of claim 15, wherein the second communication apparatus is a terminal device, and the transmission channel is a peer-to-peer P2P channel; and the wireless communication chip is configured to establish the transmission channel with the second communication apparatus by establishing the P2P channel with the second communication apparatus through P2P hole punching.

17. The battery-powered communication apparatus of claim 15, wherein the wireless communication chip is further configured to, after the service processing chip enters the working mode, modify a first mapping relationship in a stored mapping relationship to a second mapping relationship; or add a first mapping relationship to a stored mapping relationship, wherein the second mapping relationship is an association relationship between first parameter information and an identifier of the service processing chip, the second mapping relationship is used for determining that a communication data packet carrying the first parameter information is processed by the service processing chip, the first mapping relationship is an association relationship between second parameter information and an identifier of the wireless communication chip, and the first mapping relationship is used for determining that a network data packet carrying the second parameter information is processed by the wireless communication chip.

18. The battery-powered communication apparatus of claim 15, wherein the wireless communication chip is further configured to, before the service processing chip enters the working mode, receive a second network data packet sent by the second communication apparatus through the transmission channel, wherein the second network data packet carries the second parameter information; and decapsulate the second network data packet by using a second network protocol stack.

19. The battery-powered communication apparatus of claim 15, wherein the service processing chip is further configured to, after sending the occupation notification, send an occupation release notification to the wireless communication chip, wherein the occupation release notification notifies the wireless communication chip that the service processing chip has stopped using the transmission channel; and the wireless communication chip is further configured to, after receiving the occupation release notification, resume using the transmission channel to send the network data packet generated by the wireless communication chip to the second communication apparatus.

20. The battery-powered communication apparatus of claim 15, wherein the service processing chip is configured to send the to-be-sent first network data packet to the second communication apparatus by encapsulating to-be-sent service data into first-format data that comprises data type information that indicates a data type of the to-be-sent service data;

encapsulating the first-format data into the first network data packet based on channel information of the transmission channel by using a first network protocol stack, and sending the first network data packet to the wireless communication chip; and sending, by the wireless communication chip, the first network data packet to the second communication apparatus.

* * * * *